US012602675B2

(12) United States Patent
Ujisato et al.

(10) Patent No.: US 12,602,675 B2
(45) Date of Patent: Apr. 14, 2026

(54) INFORMATION PROCESSING DEVICE AND INFORMATION PROCESSING SYSTEM

(71) Applicant: Sony Group Corporation, Tokyo (JP)

(72) Inventors: Takanobu Ujisato, Tokyo (JP); Yasuto Masuda, Kanagawa (JP); Masayuki Imanishi, Tokyo (JP); Jun Shinomiya, Kanagawa (JP); Tsukasa Kobayashi, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 556 days.

(21) Appl. No.: 18/017,110

(22) PCT Filed: Jul. 16, 2021

(86) PCT No.: PCT/JP2021/026737
§ 371 (c)(1),
(2) Date: Jan. 20, 2023

(87) PCT Pub. No.: WO2022/024801
PCT Pub. Date: Feb. 3, 2022

(65) Prior Publication Data
US 2023/0325797 A1     Oct. 12, 2023

(30) Foreign Application Priority Data

Jul. 29, 2020     (JP) ................................ 2020-128450

(51) Int. Cl.
*G06Q 20/12*          (2012.01)
*G06F 21/10*          (2013.01)
(Continued)

(52) U.S. Cl.
CPC ......... *G06Q 20/1235* (2013.01); *G06F 21/10* (2013.01); *G06Q 20/127* (2013.01);
(Continued)

(58) Field of Classification Search
CPC ............. G06Q 20/1235; G06Q 20/127; G06Q 20/3825; G06Q 50/184; G06Q 2220/18;
(Continued)

(56) References Cited

U.S. PATENT DOCUMENTS

2004/0003270 A1*  1/2004  Bourne ................... G06F 21/10
                                                    713/193
2009/0125607 A1*  5/2009  Rhoads .............. H04N 21/8358
                                                    707/E17.014
(Continued)

FOREIGN PATENT DOCUMENTS

JP          2003122726 A5      4/2003
JP          2003288303 A       10/2003
(Continued)

OTHER PUBLICATIONS

JP2004200744A (Machine Translation of JP2004200744A) (Year: 2004).*

(Continued)

*Primary Examiner* — Brian F Shaw
(74) *Attorney, Agent, or Firm* — Michael Best & Friedrich LLP

(57)          ABSTRACT

Information processing devices that enable management of acquisition of a content and use of an acquired content are disclosed. In one example, a content acquired in a content acquisition permission area and ticket identification information associated with the content and configured to identify a ticket for entering the content acquisition permission area are supplied to an external device. Permission to use content is determined on the basis of information regarding a user corresponding to ticket identification information (Continued)

associated with the content acquired in a content acquisition permission area, and identification of a ticket for entering the content acquisition permission area.

20 Claims, 23 Drawing Sheets

(51) Int. Cl.
| | |
|---|---|
| *G06Q 20/38* | (2012.01) |
| *G06V 20/52* | (2022.01) |
| *G06V 40/10* | (2022.01) |
| *G06Q 50/18* | (2012.01) |

(52) U.S. Cl.
CPC ......... *G06Q 20/3825* (2013.01); *G06V 20/52* (2022.01); *G06V 40/10* (2022.01); *G06F 21/1073* (2023.08); *G06Q 50/184* (2013.01)

(58) Field of Classification Search
CPC ...... G06Q 10/02; G06Q 30/018; G06Q 30/06; G06Q 30/0609; G06Q 30/02; G06V 20/52; G06V 40/10; G06F 21/1073; G06F 21/64; G06F 21/10; G06F 16/951; H04N 21/8355; H04N 21/2541; H04L 9/32
See application file for complete search history.

(56)        References Cited

U.S. PATENT DOCUMENTS

| | | | |
|---|---|---|---|
| 2017/0180327 A1 | 6/2017 | Levin | |
| 2017/0330263 A1* | 11/2017 | Shaffer | .............. G06Q 20/3274 |
| 2018/0114147 A1 | 4/2018 | Gurvey | |
| 2018/0278422 A1* | 9/2018 | Young | ................... G06Q 10/02 |

FOREIGN PATENT DOCUMENTS

| | | | |
|---|---|---|---|
| JP | 2004200744 A | 7/2004 | |
| JP | 2007005895 A | 1/2007 | |
| JP | 2008022372 A | 1/2008 | |
| JP | 2011123818 A | 6/2011 | |
| JP | 2014192753 A | 10/2014 | |
| JP | 2020064548 A | 4/2020 | |

OTHER PUBLICATIONS

International Search Report (PCT/ISA/210), International Application No. PCT/JP2021/026737, dated Sep. 14, 2021.

* cited by examiner

Figure 7:
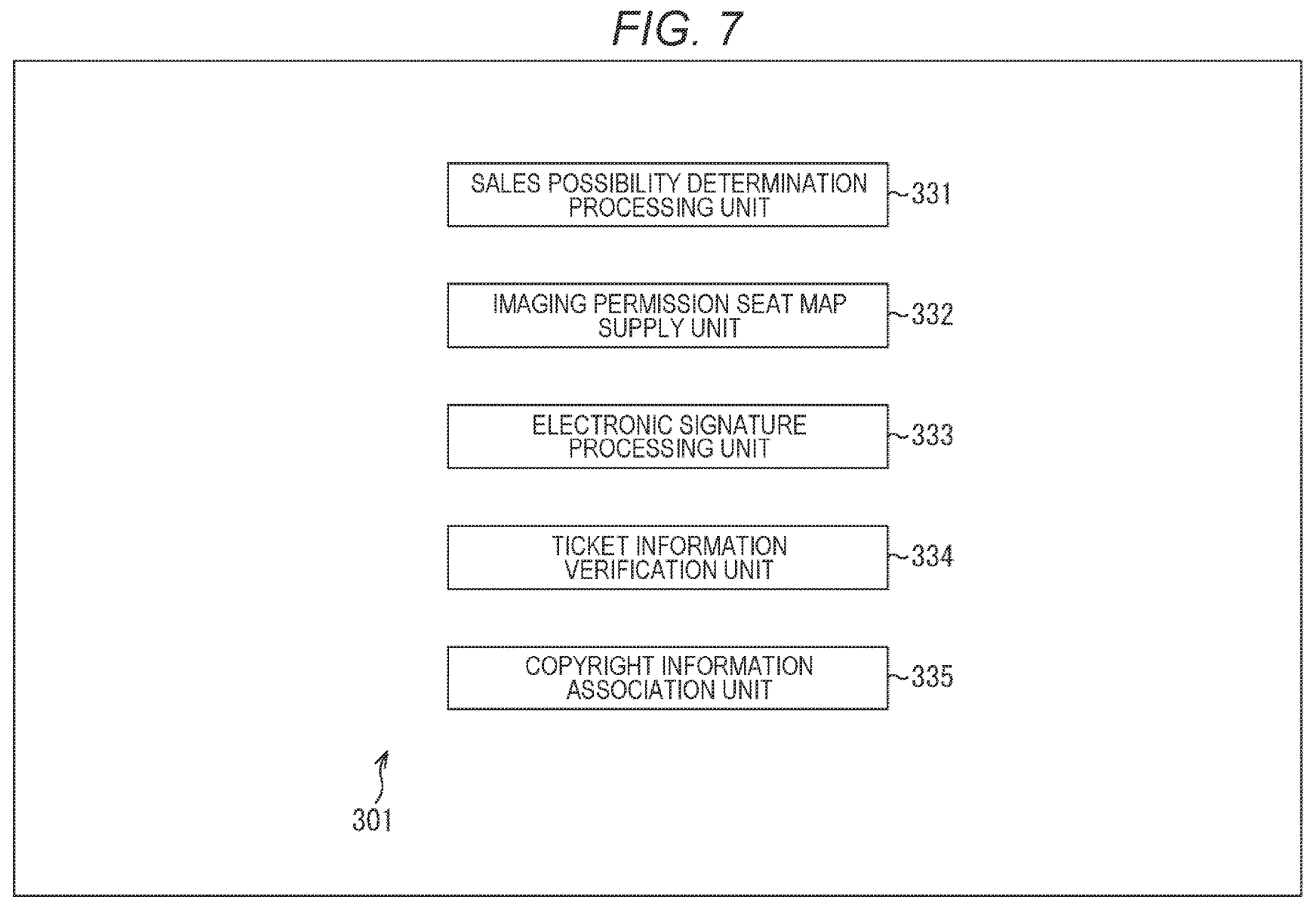

SALES POSSIBILITY DETERMINATION PROCESSING UNIT ~331

IMAGING PERMISSION SEAT MAP SUPPLY UNIT ~332

ELECTRONIC SIGNATURE PROCESSING UNIT ~333

TICKET INFORMATION VERIFICATION UNIT ~334

COPYRIGHT INFORMATION ASSOCIATION UNIT ~335

301

POSTING RECEPTION UNIT 〜431

CAPTURED IMAGE VERIFICATION UNIT 〜432

CAPTURED IMAGE RELEASE UNIT 〜433

601

ELECTRONIC TICKET

611

TICKET IDENTIFIER

612

PURCHASER INFORMATION
PURCHASER IDENTIFIER

613

IMAGING PERMISSION INFORMATION
IMAGING-POSSIBLE TIME ZONE CONDITION
IMAGING TIME LENGTH CONDITION
IMAGING COUNT CONDITION
IMAGE SIZE (RESOLUTION) CONDITION
DETAIL CONDITION (SIZE OF IMAGING TARGET, ETC.)
FORMAT CONDITION
IMAGE FORMAT (CODEC, COMPRESSION RATE, ETC.) CONDITION
AUDIO FORMAT (CODEC, SAMPLING RATE, ETC.) CONDITION

*FIG. 21*

| Image Rights | Creator/Photographer<br>Copyright Notice<br>Copyright Info URL<br>Rights Usage Terms<br>Releasedate<br>Expirationdate | TICKET IDENTIFIER<br><br>Right Usage Terms INCLUDE POSTING-POSSIBLE SITE INFORMATION, INFORMATION INDICATING PREVENTION OF COMMERCIAL EXPLOITATION, ETC. |
| Event and Location | Event<br>City<br>Sublocation<br>Province/State<br>Country | |
| Contact Info | Address<br>City<br>State/Province<br>Postal Code<br>Country<br>Email(s)<br>Phone(s)<br>Web URL(s) | EVENT SPONSOR/<br>COPYRIGHT ADMINISTRATOR INFORMATION |
| Licensing | Copyright owner<br>Image Creator | TICKET IDENTIFIER |
| Special Instructions | UNPROCESSED COPY/LINK IS PERMITTED<br>SIZE/LENGTH CHANGE (ONLY CROPPING) IS PERMITTED<br>Caption ADDITION IS PERMITTED<br>COLOR PROCESSING IS PERMITTED<br>COMBINATION WITH ANOTHER IMAGE IS PERMITTED<br>AUDIO PROCESSING IS PERMITTED<br>IMAGE/AUDIO FORMAT CONVERSION IS PERMITTED | SECONDARY USE CONDITION |

*FIG. 23*

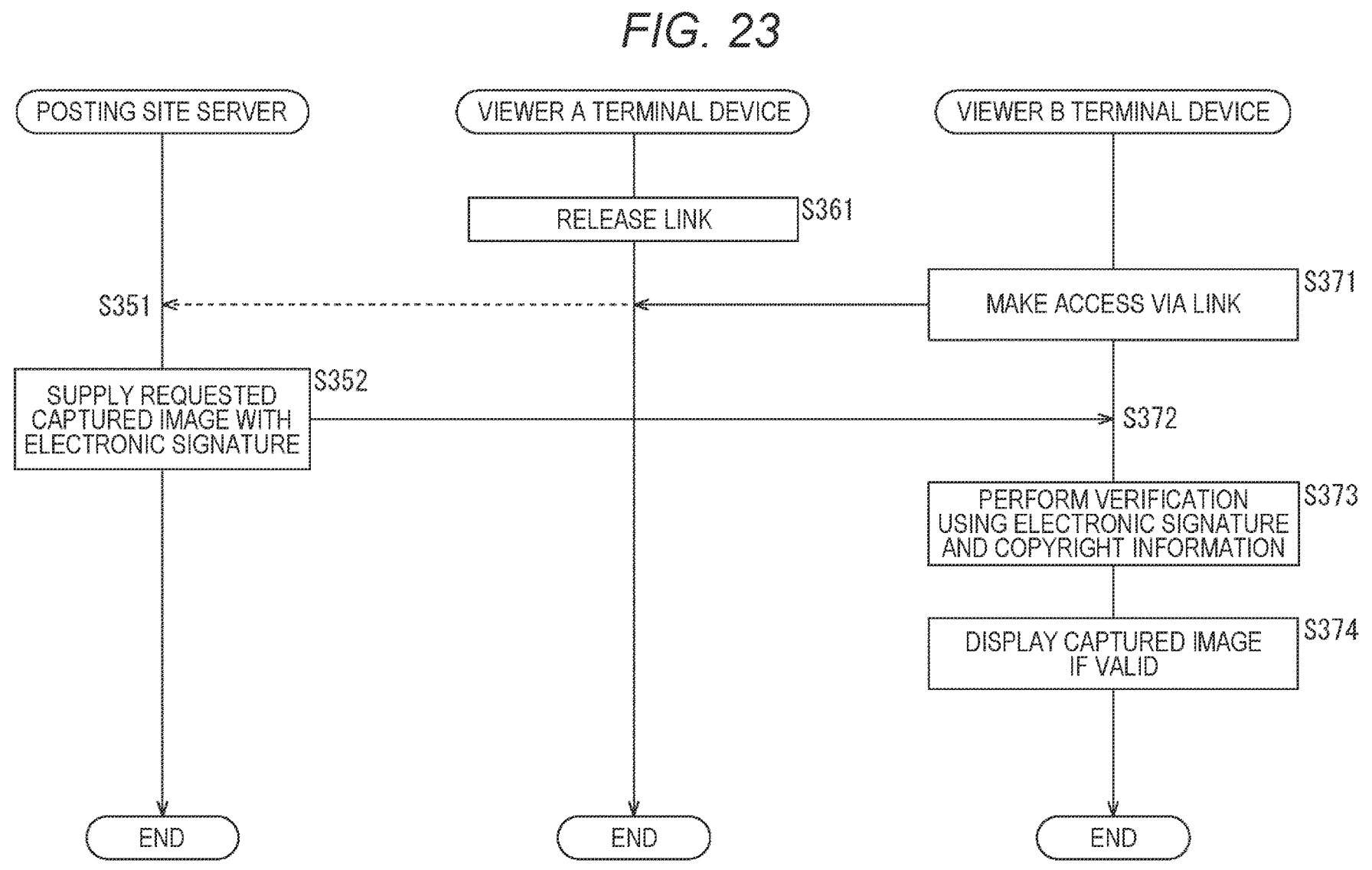

POSTING SITE SERVER

VIEWER A TERMINAL DEVICE

VIEWER B TERMINAL DEVICE

S371 — MAKE ACCESS VIA LINK

S372

S373 — PERFORM VERIFICATION USING ELECTRONIC SIGNATURE AND COPYRIGHT INFORMATION

S374 — DISPLAY CAPTURED IMAGE IF VALID

END

S361 — RELEASE LINK

END

S351

S352 — SUPPLY REQUESTED CAPTURED IMAGE WITH ELECTRONIC SIGNATURE

END

INFORMATION PROCESSING DEVICE AND INFORMATION PROCESSING SYSTEM

TECHNICAL FIELD

The present disclosure relates to an information processing device and an information processing system, and more particularly, to an information processing device and an information processing system which enable management of acquisition of a content and use of an acquired content.

BACKGROUND ART

In recent years, portable information processing devices having functions of imaging, recording, and the like, such as so-called smartphones, have become widespread, so that the imaging can be performed more easily than before. Therefore, it is difficult to manage content acquisition actions, such as imaging and recording, and use of an acquired content. For example, it is difficult to specify and stop unauthorized content acquisition actions (imaging, recording, and the like) of audiences or the like in event venues of a concert and the like or to specify whether or not a content posted on a posting site or the like has been illegally acquired in such a manner.

For example, there is a method in which a captured image or the like is converted into a hash value in a digital camera or the like, and an electronic signature using the hash value is given to the captured image to be used for sensing of tampering (see, for example, Patent Document 1). When this technology is applied, tampering of a content by the third party can be suppressed.

CITATION LIST

Patent Document

Patent Document 1: Japanese Patent Application Laid-Open No. 2008-22372

SUMMARY OF THE INVENTION

Problems to be Solved by the Invention

However, it is difficult to suppress, for example, illegal content acquisition actions and use of an illegally acquired content with this technology.

The present disclosure enables management of acquisition of a content and use of an acquired content.

Solutions to Problems

An information processing device according to one aspect of the present technology is an information processing device including a supply unit that supplies, to an external device, a content acquired in a content acquisition permission area and ticket identification information associated with the content and configured to identify a ticket for entering the content acquisition permission area.

An information processing device according to another aspect of the present technology is an information processing device including a determination unit that determines whether or not to permit use of a content on the basis of user-related information that is information regarding a user corresponding to ticket identification information associated with the content acquired in a content acquisition permission area and configured to identify a ticket for entering the content acquisition permission area.

An information processing system according to still another aspect of the present technology is an information processing system including a first information processing device and a second information processing device. The first information processing device includes a content ticket identification information supply unit that supplies, to the second information processing device, a content acquired in a content acquisition permission area and ticket identification information associated with the content and configured to identify a ticket for entering the content acquisition permission area. The second information processing device includes: a content ticket identification information acquisition unit that acquires the content and the ticket identification information which are supplied from the first information processing device; and a permission determination unit that determines whether or not to permit use of the content on the basis of information regarding a user corresponding to the ticket identification information acquired by the content ticket identification information acquisition unit.

In the information processing device according to the one aspect of the present technology, the content acquired in the content acquisition permission area and the ticket identification information associated with the content and configured to identify the ticket for entering the content acquisition permission area are supplied to the external device.

In the information processing device according to the another aspect of the present technology, whether or not to permit the use of the content is determined on the basis of the user-related information that is the information regarding the user corresponding to the ticket identification information associated with the content acquired in the content acquisition permission area and configured to identify the ticket for entering the content acquisition permission area.

In the information processing system according to the still another aspect of the present technology, the first information processing device supplies, to the second information processing device, the content acquired in the content acquisition permission area and the ticket identification information associated with the content and configured to identify the ticket for entering the content acquisition permission area, and the second information processing device acquires the content and the ticket identification information which are supplied from the first information processing device, and determines whether or not to permit the use of the content on the basis of the information regarding the user corresponding to the acquired ticket identification information.

BRIEF DESCRIPTION OF DRAWINGS

FIG. 1 is a diagram illustrating an example of an overview of a content management system.

FIG. 2 is a diagram illustrating a main configuration example of a user terminal device.

FIG. 4 is a block diagram illustrating a main configuration example of a ticket sales server.

FIG. 7 is a functional block diagram illustrating functions implemented in the copyright management server.

FIG. 12 is a block diagram illustrating a main configuration example of a viewer terminal device.

FIG. 16 is a diagram illustrating a configuration example of an electronic ticket.

FIG. 21 is a diagram illustrating an example of copyright information.

FIG. 23 is a flowchart illustrating an example of a flow of content secondary use processing.

MODE FOR CARRYING OUT THE INVENTION

Figure 3:
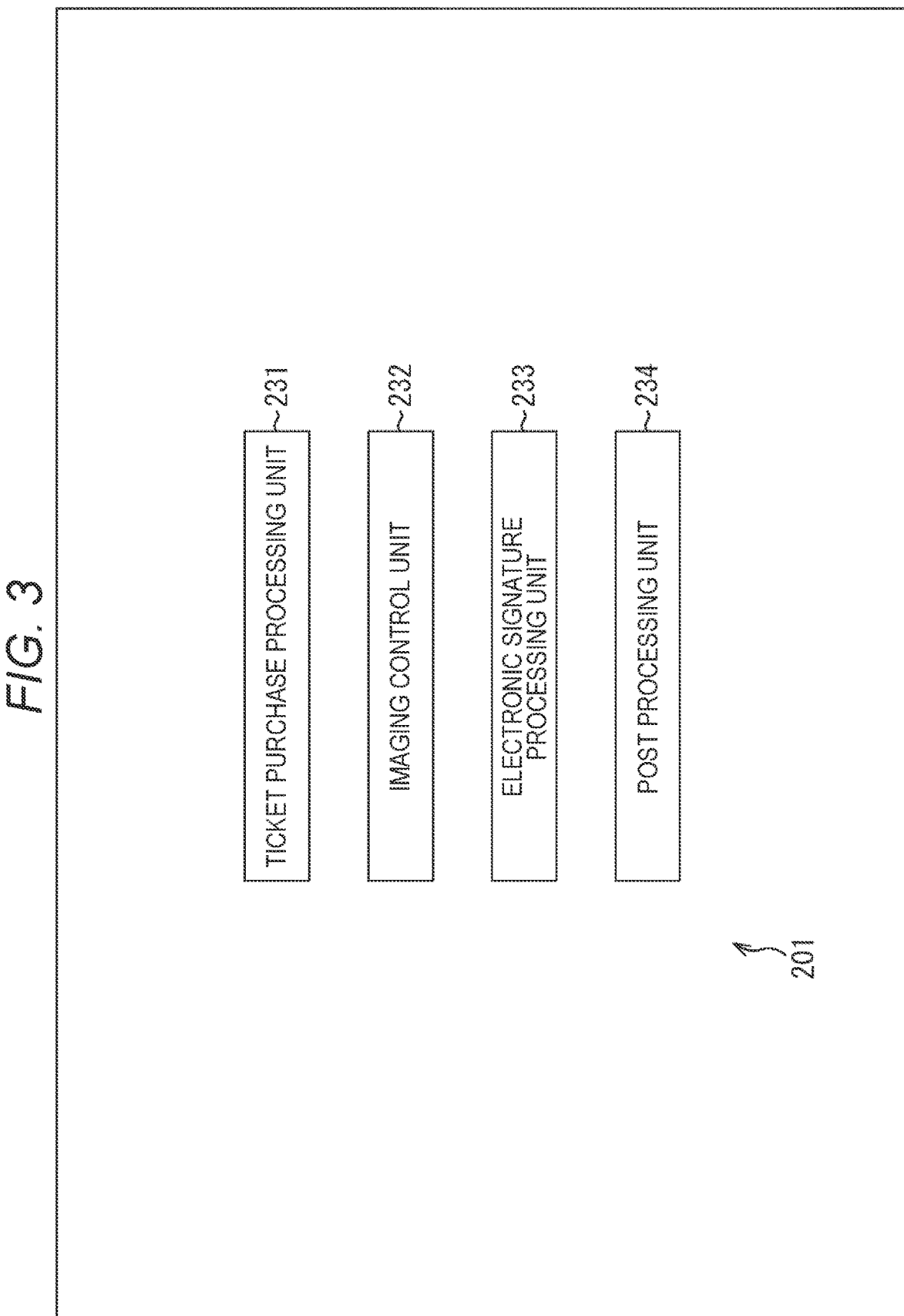
FIG. 3 is a functional block diagram illustrating functions implemented in the user terminal device.

Hereinafter, modes for carrying out the present disclosure (hereinafter referred to as embodiments) will be described. Note that a description will be given in the following order.
1. First Embodiment (Content Management System)
2. Appendix

1. First Embodiment

<Acquisition and Use of Content>

In recent years, portable information processing devices having functions of imaging, recording, and the like, such as so-called smartphones, have become widespread, so that the imaging can be performed more easily than before. Therefore, it is difficult to manage content acquisition actions, such as imaging and recording, and use of an acquired content. For example, it is difficult to specify and stop unauthorized content acquisition actions (imaging, recording, and the like) of audiences or the like in event venues of a concert and the like or to specify whether or not a content posted on a posting site or the like has been illegally acquired in such a manner.

For example, Patent Document 1 discloses a method in which a captured image or the like is converted into a hash value in a digital camera or the like, and an electronic signature using the hash value is given to the captured image to be used for sensing of tampering. When this technology is applied, tampering of a content by the third party can be suppressed.

However, it is difficult to suppress, for example, illegal content acquisition actions and use of an illegally acquired content with this technology.

Therefore, a ticket with an imaging right is sold, and information regarding the ticket is associated with a content. For example, a content acquired in a content acquisition permission area and ticket identification information associated with the content and configured to identify a ticket for entering the content acquisition permission area are supplied to an external device. For example, an information processing device includes a supply unit that supplies, to the external device, the content acquired in the content acquisition permission area and the ticket identification information associated with the content and configured to identify the ticket for entering the content acquisition permission area.

As a result, acquisition of the content and use of the content can be managed on the basis of the ticket identification information. Therefore, it is possible to suppress illegal acquisition of the content and illegal use of the content.

<Content Management System>

Figure 1:
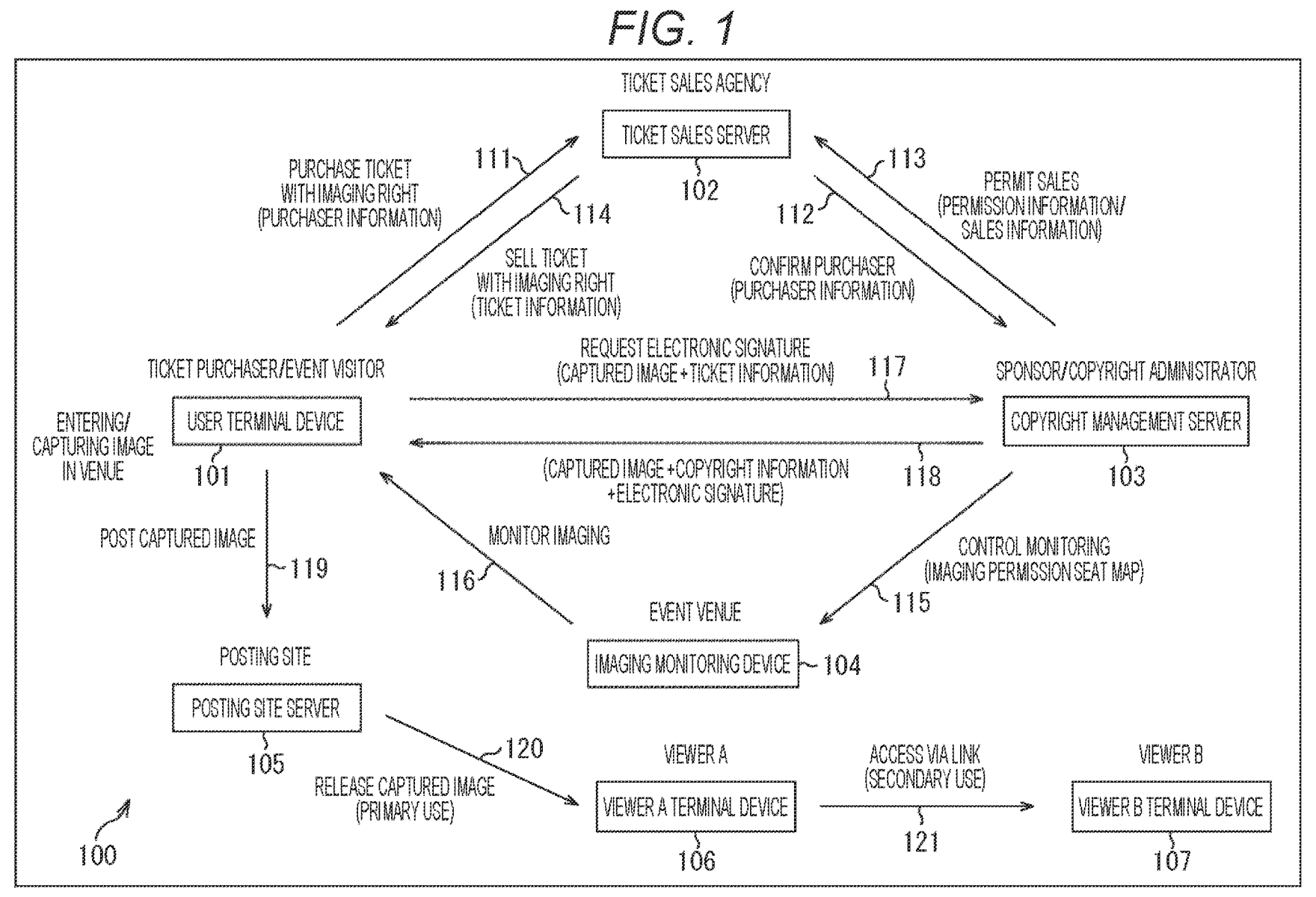

FIG. 1 is a diagram illustrating a main configuration example of a content management system which is an embodiment of an information processing system to which the present technology is applied. A content management system 100 illustrated in FIG. 1 is a system that manages acquisition of contents, such as captured images and audio, in an event venue and use of the contents acquired in the event venue.

As illustrated in FIG. 1, the content management system 100 includes a user terminal device 101, a ticket sales server 102, a copyright management server 103, an imaging monitoring device 104, a posting site server 105, a viewer A terminal device 106, and a viewer B terminal device 107. The devices are connected to be capable of communicating with each other, and transmission and reception of information can be performed at least as indicated by arrows in FIG. 1 between the devices.

The user terminal device 101 is an information processing device owned by a user who participates in an event (enters an event venue). This user purchases a ticket with an imaging right and enters the event venue. The ticket with the imaging right is an entrance ticket for entering the event venue, and is a ticket assigned with a right to perform imaging in an area where the imaging is permitted, the area being provided inside the event venue. For example, imaging by the user who has purchased the ticket with the imaging right is permitted on a seat designated by the ticket with the imaging right. The user terminal device 101 performs processing such as purchase of the ticket with the imaging right, capturing an image in the event venue, association of an electronic signature or the like with the captured image, and posting of the captured image.

The ticket sales server 102 is an information processing device owned by a ticket sales agency, and performs processing related to sales and the like of the ticket with the imaging right. The copyright management server 103 is an information processing device owned by an event sponsor or a copyright administrator, and performs processing of confirming a ticket purchaser, processing related to association of an electronic signature, processing related to monitoring of an imaging action in the event venue, and the like. The imaging monitoring device 104 is an information processing device installed in the event venue, and performs processing related to monitoring of an imaging action taken by an event participant, and the like.

The posting site server 105 is an information processing device owned by a posting site operator, and performs processing related to release and the like of the posted captured image. The viewer A terminal device 106 is an information processing device owned by a viewer A, and performs processing related to viewing, secondary use, and the like of the captured image released on the posting site. The viewer B terminal device 107 is an information processing device owned by a viewer B, and performs processing related to browsing of the captured image secondarily used by the viewer A terminal device 106.

In such a content management system 100, for example, the user terminal device 101 supplies purchaser information that is information regarding the user who purchases the ticket to the ticket sales server 102, and performs a procedure for purchasing the ticket with the imaging right (arrow 111). The ticket sales server 102 supplies the purchaser information to the copyright management server 103 (arrow 112) in order to confirm whether or not to it is okay to sell the ticket with the imaging right to the user. The copyright management server 103 confirms the purchaser information by using a past history or the like, and, if there is no problem, supplies permission information that is control information for permitting sales, and sales information that is information necessary for selling the ticket, to the ticket sales server 102 to permit sales (arrow 113).

When the sales are permitted, the ticket sales server 102 performs a sales procedure to sell the ticket with the imaging right. The ticket with the imaging right may be an electronic ticket or a paper ticket. In the case of an electronic ticket, the ticket sales server 102 supplies the electronic ticket (ticket information) to the user terminal device 101 (arrow 114). In the case of a paper ticket, the ticket sales server 102 supplies ticket information to the user terminal device 101 as a notification indicating the fact of being sold (arrow 114).

The user enters the event venue using the ticket with the imaging right, and performs imaging in the area where the imaging is permitted (for example, seat or the like designated by the ticket with the imaging right) using the user terminal device 101 to generate a captured image. The imaging monitoring device 104 acquires an imaging permission seat map indicating the area (seat) where the imaging is permitted from the copyright management server 103 (arrow 115). The imaging monitoring device 104 monitors an imaging action in the event venue on the basis of the information (arrow 116).

The user terminal device 101 that has generated the captured image associates the captured image with the ticket information corresponding to the ticket with the imaging right, and supplies the associated result to the copyright management server 103 to request association of an electronic signature (arrow 117). The copyright management server 103 associates copyright information with the captured image, further generates and associates the electronic signature therewith, and supplies them to the user terminal device 101 (arrow 118).

The user terminal device 101 posts the captured image with the electronic signature to the posting site server 105 (arrow 119). The posting site server 105 releases the captured image with the electronic signature. Since the copyright information and the electronic signature are associated with the captured image in this captured image with the electronic signature, the posting site server 105 can suppress release of an illegally acquired content.

The viewer A terminal device 106 acquires the captured image with the electronic signature released by the posting site server 105 (arrow 120). Furthermore, the viewer A terminal device 106 makes secondary use such as disclosing a link of the captured image with the electronic signature. The viewer B terminal device 107 accesses the posting site server 105 by following the link, and acquires the captured image with the electronic signature (arrow 121).

As described above, acquisition of a content and use of the acquired content can be managed by performing each processing on the content associated with ticket information.

<User Terminal Device>

Figure 2:
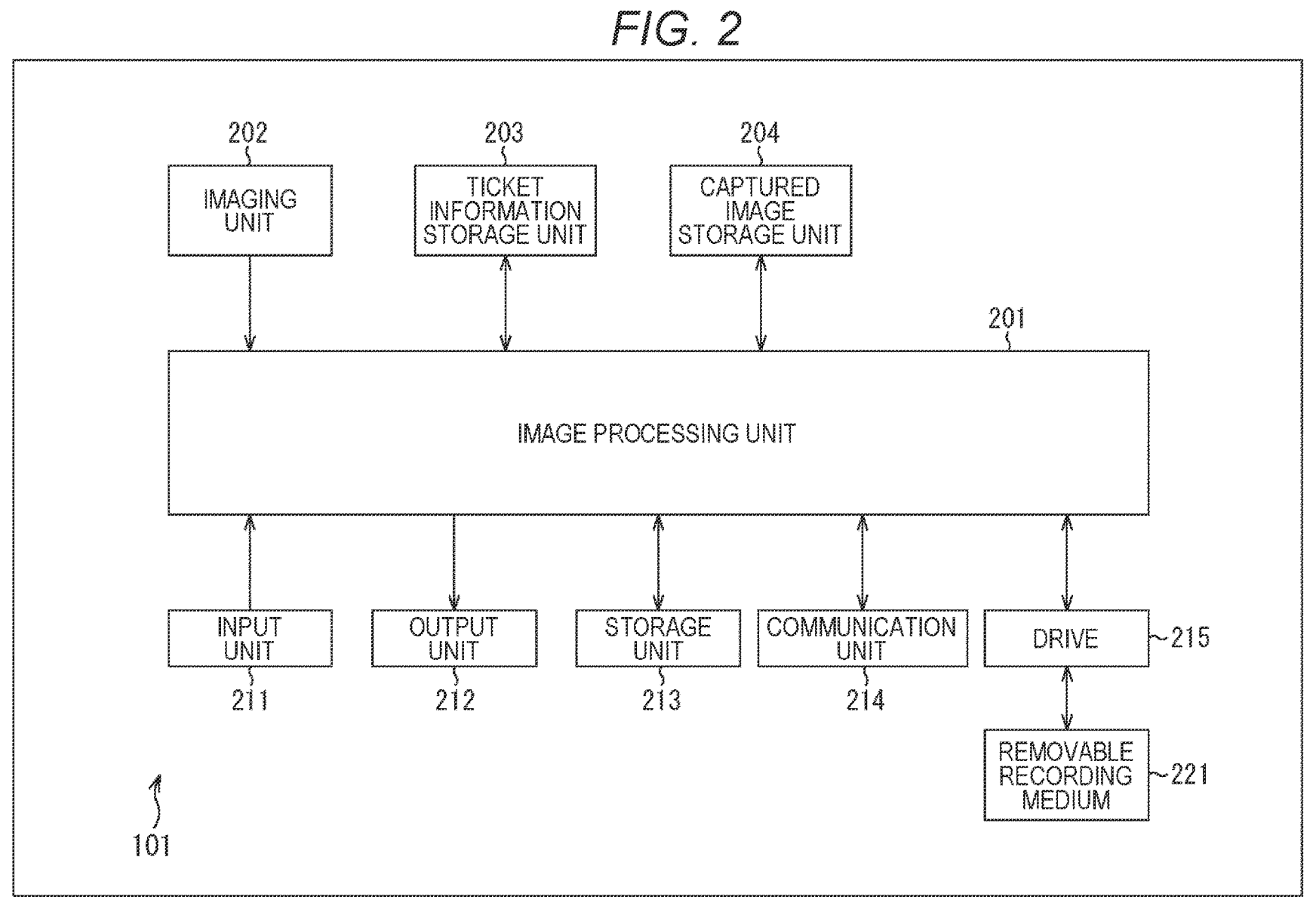

FIG. 2 is a diagram illustrating a main configuration example of the user terminal device 101 which is an embodiment of the information processing device to which the present technology is applied. As illustrated in FIG. 2, the user terminal device 101 includes an information processing unit 201, an imaging unit 202, a ticket information storage unit 203, a captured image storage unit 204, an input unit 211, an output unit 212, a storage unit 213, a communication unit 214, and a drive 215.

The information processing unit 201 is a computer that includes, for example, a central processing unit (CPU), a read only memory (ROM), a random access memory (RAM), and the like and can implement various functions by executing an application program (software) using them. For example, the information processing unit 201 can install and execute an application program (software) that performs processing related to purchase of a ticket, an application program that performs processing related to imaging, an application program that performs processing related to an electronic signature, an application program that performs processing related to posting of a captured image, and the like. Here, the computer includes a computer built in dedicated hardware, and, for example, a general-purpose personal computer, a portable information processing terminal, and the like capable of executing various functions by installing various programs, and the like.

The imaging unit 202 includes an optical system, an image sensor, and the like, and can capture an image of a subject to generate the captured image. The imaging unit 202 can supply the generated captured image to the information processing unit 201.

The ticket information storage unit 203 includes a storage medium such as a hard disk, a RAM disk, and a non-volatile memory, and can store ticket information and the like.

The captured image storage unit 204 includes a storage medium such as a hard disk, a RAM disk, or a non-volatile memory and can store the captured image or the like generated by the imaging unit 202.

The input unit 211 includes input devices, for example, a keyboard, a mouse, a microphone, a touch panel, an input terminal, and the like and can supply information input via these input devices to the information processing unit 201.

The output unit 212 includes output devices, for example, a display (display unit), a speaker (audio output unit), an output terminal, and the like and can output the information supplied from the information processing unit 201 via these output devices.

The storage unit 213 includes a storage medium, for example, a hard disk, a RAM disk, a non-volatile memory, or the like and can store the information supplied from the information processing unit 201 in the storage medium. The storage unit 213 can read information stored in the storage medium and supply the information to the information processing unit 201.

The communication unit 214 includes, for example, a network interface and can receive information transmitted from another device and supply the received information to the information processing unit 201. The communication unit 214 can transmit information supplied from the information processing unit 201 to another device.

The drive 215 has an interface of a removable recording medium 221, such as a magnetic disk, an optical disk, a magneto-optical disk, or a semiconductor memory, and can read information recorded in the removable recording medium 221 attached to the drive itself and supply the information to the information processing unit 201. The drive 215 can record information supplied from the information processing unit 201 in the removable recording medium 221 which has been attached to the drive itself and to which writing is possible.

For example, the information processing unit 201 loads and executes an application program stored in the storage unit 213. At that time, the information processing unit 201 can appropriately store data and the like necessary for executing various types of processing. The application program, the data, and the like can be provided in the state of being recorded in the removable recording medium 221 as package media or the like, for example. In such a case, the application program, the data, and the like are read by the drive 215 to which the removable recording medium 221 is attached, and are installed in the storage unit 213 via the information processing unit 201. Furthermore, the application program can also be provided via a wired or wireless transmission medium such as a local area network, the Internet, or digital satellite broadcasting. In such a case, the application program, the data, and the like are received by the communication unit 214 and installed in the storage unit 213 via the information processing unit 201. Furthermore, the application program, the data, and the like can be installed in advance in the ROM or the storage unit 213 in the information processing unit 201.

<Functional Blocks of User Terminal Device>

Functions implemented as the information processing unit 201 executes application programs are illustrated in FIG. 3 as functional blocks. As illustrated in FIG. 3, the information processing unit 201 can include a ticket purchase processing unit 231, an imaging control unit 232, an electronic signature processing unit 233, and a posting processing unit 234 as the functional blocks by executing the application programs.

The ticket purchase processing unit 231 performs processing related to purchase of a ticket with an imaging right. The imaging control unit 232 performs processing related to control of the imaging unit 202. The electronic signature processing unit 233 performs processing related to association of an electronic signature with a captured image. The posting processing unit 234 performs processing related to posting of the captured image.

<Ticket Sales Server>

Figure 4:
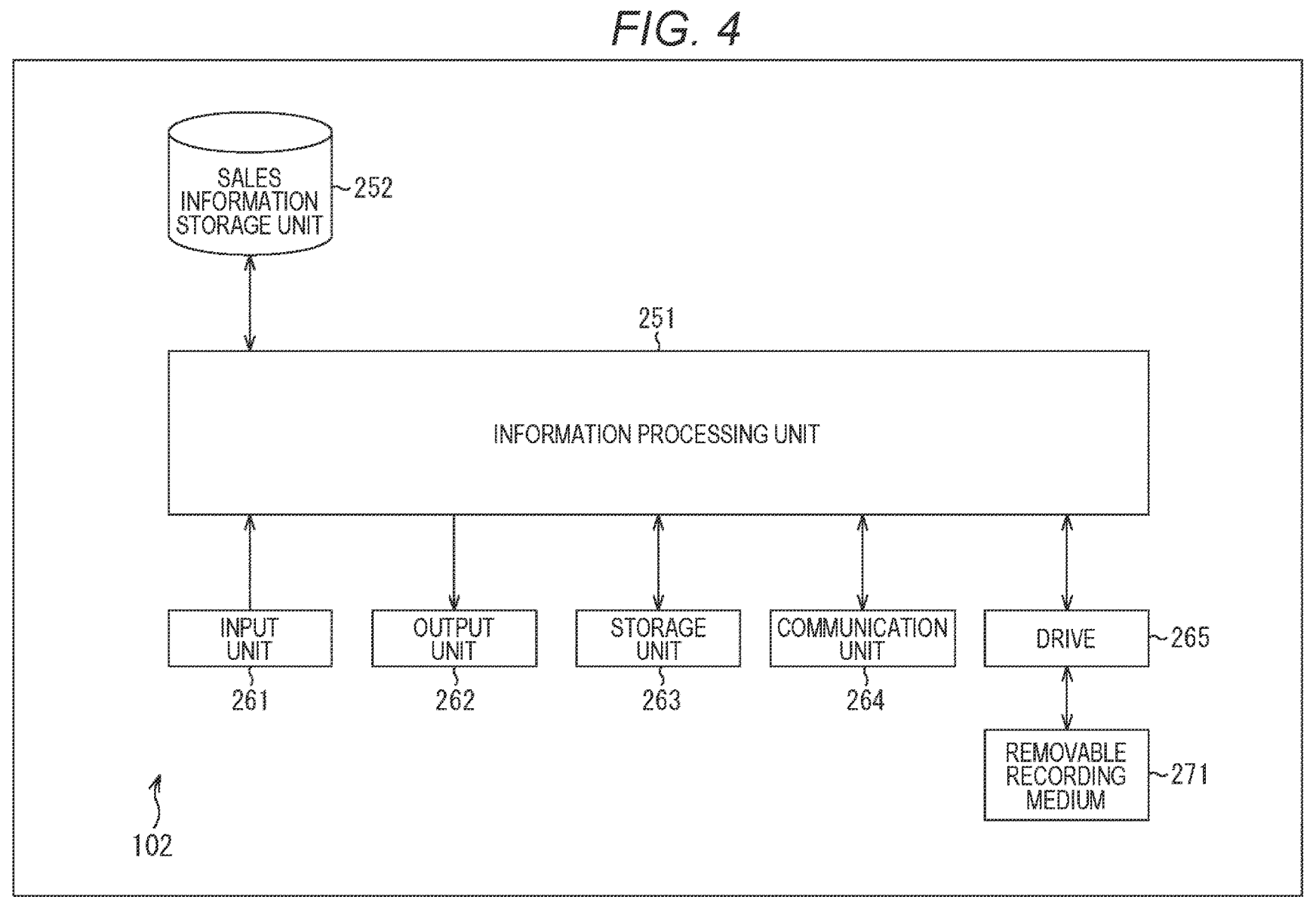

FIG. 4 is a diagram illustrating a main configuration example of the ticket sales server 102 which is an embodiment of the information processing device to which the present technology is applied. As illustrated in FIG. 4, the ticket sales server 102 includes an information processing unit 251, a sales information storage unit 252, input unit 261, an output unit 262, a storage unit 263, a communication unit 264, and drive 265.

The information processing unit 251 is a computer that includes, for example, a CPU, a ROM, a RAM, and the like, and can implement various functions by executing application programs (software) using them. For example, the information processing unit 251 can install and execute an application program (software) or the like that performs processing related to ticket sales. Here, the computer includes a computer built in dedicated hardware, and, for example, a general-purpose personal computer, a portable information processing terminal, and the like capable of executing various functions by installing various programs, and the like.

The sales information storage unit 252 includes a storage medium such as a hard disk, a RAM disk, or a nonvolatile memory, and can store, for example, sales information or the like that is information regarding ticket sales, such as a seat corresponding to a ticket to be sold, a ticket price, information regarding payment, and information regarding a purchaser.

The input unit 261 includes input devices, for example, a keyboard, a mouse, a microphone, a touch panel, an input terminal, and the like and can supply information input via these input devices to the information processing unit 251.

The output unit 262 includes output devices, for example, a display (display unit), a speaker (audio output unit), an output terminal, and the like and can output the information supplied from the information processing unit 251 via these output devices.

The storage unit 263 includes a storage medium, for example, a hard disk, a RAM disk, a non-volatile memory, or the like and can store the information supplied from the information processing unit 251 in the storage medium. The storage unit 263 can read information stored in the storage medium and supply the information to the information processing unit 251.

The communication unit 264 includes, for example, a network interface and can receive information transmitted from another device and supply the received information to the information processing unit 251. The communication unit 264 can transmit information supplied from the information processing unit 251 to another device.

The drive 265 has an interface of a removable recording medium 271, such as a magnetic disk, an optical disk, a magneto-optical disk, or a semiconductor memory, and can read information recorded in the removable recording medium 271 attached to the drive itself and supply the information to the information processing unit 251. The drive 265 can record information supplied from the information processing unit 251 in the removable recording medium 271 which has been attached to the drive itself and to which writing is possible.

For example, the information processing unit 251 loads and executes an application program stored in the storage unit 263. At that time, the information processing unit 251 can appropriately store data and the like necessary for executing various types of processing. The application program, the data, and the like can be provided in the state of being recorded in the removable recording medium 271 as package media or the like, for example. In such a case, the application program, the data, and the like are read by the drive 265 to which the removable recording medium 271 is attached, and are installed in the storage unit 263 via the information processing unit 251. Furthermore, the application program can also be provided via a wired or wireless transmission medium such as a local area network, the Internet, or digital satellite broadcasting. In such a case, the application program, the data, and the like are received by the communication unit 264 and installed in the storage unit 263 via the information processing unit 251. Furthermore, the application program, the data, and the like can be installed in advance in the ROM or the storage unit 263 in the information processing unit 251.

<Functional Blocks of Ticket Sales Server>

Figure 5:
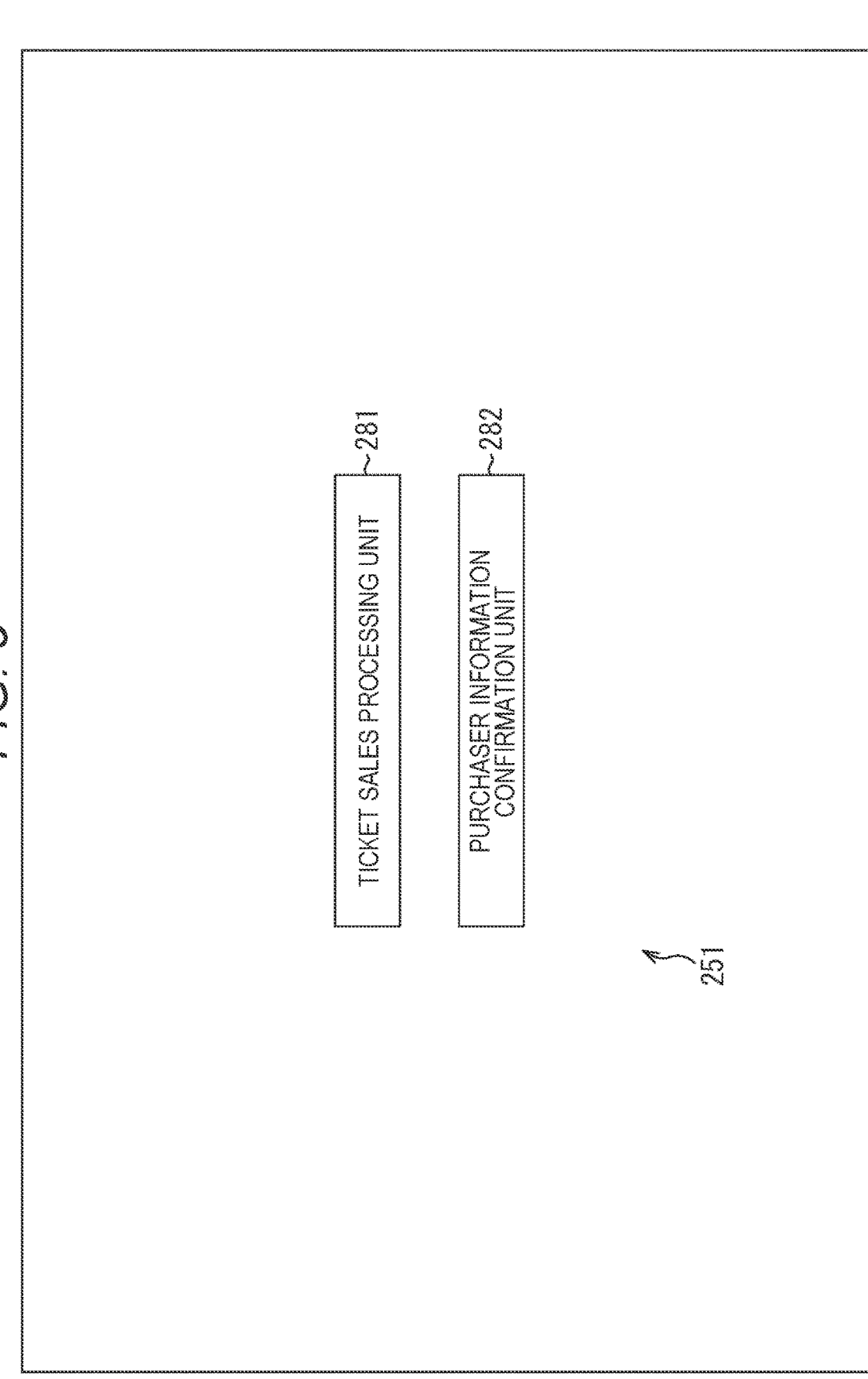
FIG. 5 is a functional block diagram illustrating functions implemented in the ticket sales server.

Functions implemented as the information processing unit 251 executes application programs are illustrated in FIG. 5 as functional blocks. As illustrated in FIG. 5, the information processing unit 251 can include a ticket sales processing unit 281 and a purchaser information confirmation unit 282.

The ticket sales processing unit 281 performs processing related to sales of a ticket with an imaging right. The purchaser information confirmation unit 282 performs processing related to confirmation of purchaser information that is information regarding a purchaser who purchases the ticket with an imaging right.

<Copyright Management Server>

Figure 6:
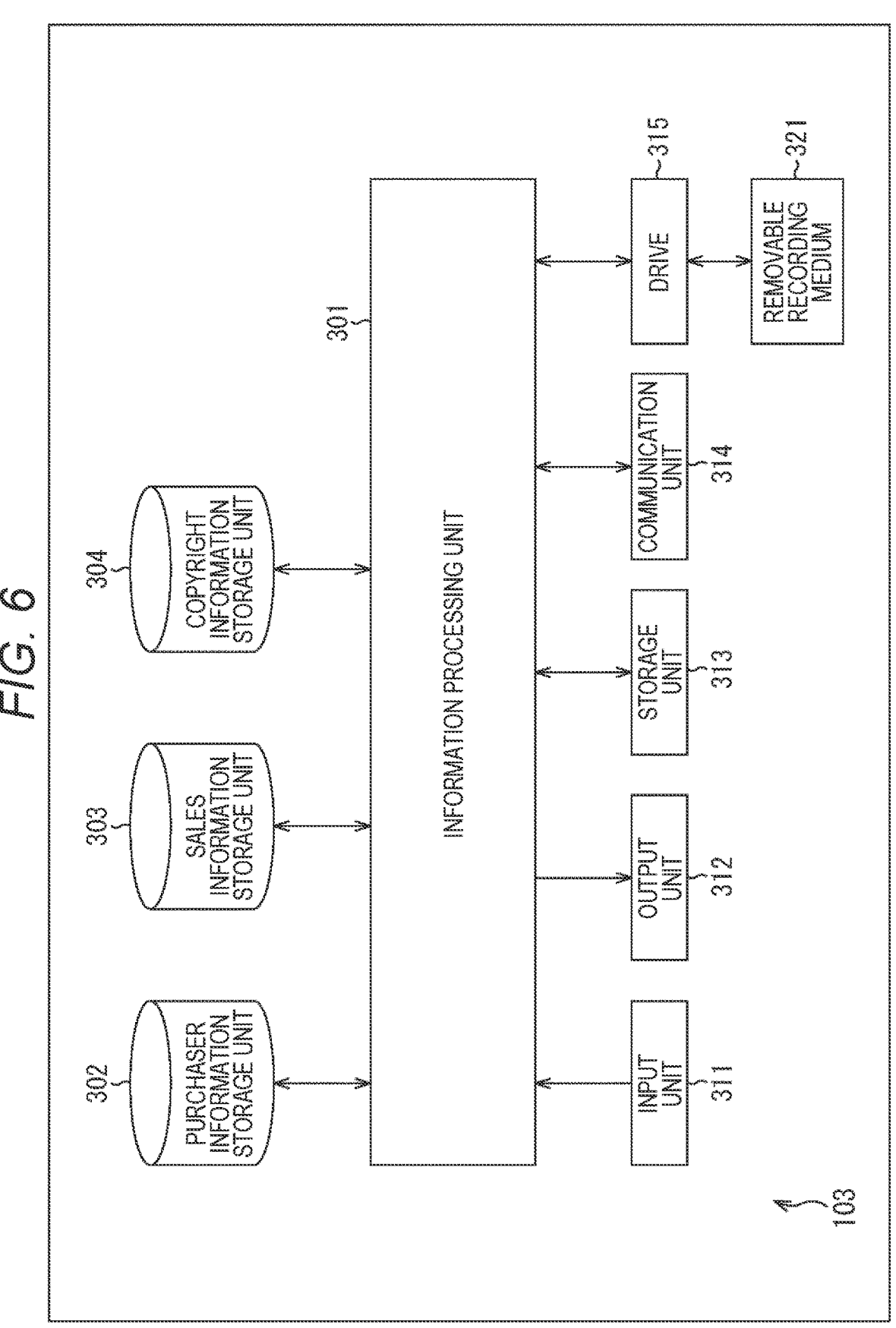
FIG. 6 is a block diagram illustrating a main configuration example of a copyright management server.

FIG. 6 is a diagram illustrating a main configuration example of the copyright management server 103 which is an embodiment of the information processing device to which the present technology is applied. As illustrated in FIG. 6, the copyright management server 103 includes an information processing unit 301, a purchaser information storage unit 302, a sales information storage unit 303, a copyright information storage unit 304, an input unit 311, an output unit 312, a storage unit 313, a communication unit 314, and a drive 315.

The information processing unit 301 is a computer that includes, for example, a CPU, a ROM, a RAM, and the like, and can implement various functions by executing application programs (software) using them. For example, the information processing unit 301 can install and execute an application program (software) or the like that performs processing related to copyright management. Here, the computer includes a computer built in dedicated hardware, and, for example, a general-purpose personal computer, a portable information processing terminal, and the like capable of executing various functions by installing various programs, and the like.

The purchaser information storage unit 302 includes a storage medium such as a hard disk, a RAM disk, or a nonvolatile memory, and can store, for example, information regarding a past action history of a purchaser (whether or not the purchaser has committed fraud or the like).

The sales information storage unit 303 includes a storage medium such as a hard disk, a RAM disk, or a nonvolatile memory, and can store, for example, sales information or the like that is information regarding ticket sales, such as a seat corresponding to a ticket to be sold, a ticket price, information regarding payment, and information regarding a purchaser.

The copyright information storage unit 304 includes a storage medium such as a hard disk, a RAM disk, or a non-volatile memory, and can store copyright information that is information regarding a copyright to be associated with a content.

The input unit 311 includes input devices, for example, a keyboard, a mouse, a microphone, a touch panel, an input terminal, and the like and can supply information input via these input devices to the information processing unit 301.

The output unit 312 includes output devices, for example, a display (display unit), a speaker (audio output unit), an output terminal, and the like and can output the information supplied from the information processing unit 301 via these output devices.

The storage unit 313 includes a storage medium, for example, a hard disk, a RAM disk, a non-volatile memory, or the like and can store the information supplied from the information processing unit 301 in the storage medium. The storage unit 313 can read information stored in the storage medium and supply the information to the information processing unit 301.

The communication unit 314 includes, for example, a network interface and can receive information transmitted from another device and supply the received information to the information processing unit 301. The communication unit 314 can transmit information supplied from the information processing unit 301 to another device.

The drive 315 has an interface of a removable recording medium 321, such as a magnetic disk, an optical disk, a magneto-optical disk, or a semiconductor memory, and can read information recorded in the removable recording medium 321 attached to the drive itself and supply the information to the information processing unit 301. The drive 315 can record information supplied from the information processing unit 301 in the removable recording medium 321 which has been attached to the drive itself and to which writing is possible.

For example, the information processing unit 301 loads and executes an application program stored in the storage unit 313. At that time, the information processing unit 301 can appropriately store data and the like necessary for executing various types of processing. The application program, the data, and the like can be provided in the state of being recorded in the removable recording medium 321 as package media or the like, for example. In such a case, the application program, the data, and the like are read by the drive 315 to which the removable recording medium 321 is attached, and are installed in the storage unit 313 via the information processing unit 301. Furthermore, the application program can also be provided via a wired or wireless transmission medium such as a local area network, the Internet, or digital satellite broadcasting. In such a case, the application program, the data, and the like are received by the communication unit 314 and installed in the storage unit 313 via the information processing unit 301. Furthermore, the application program, the data, and the like can be installed in advance in the ROM or the storage unit 313 in the information processing unit 301.

<Functional Blocks of Copyright Management Server>

Functions implemented as the information processing unit 301 executes application programs are illustrated in FIG. 7 as functional blocks. As illustrated in FIG. 7, the information processing unit 301 can include a sales possibility determination processing unit 331, an imaging permission seat map supply unit 332, an electronic signature processing unit 333, a ticket information verification unit 334, and a copyright information association unit 335.

The sales possibility determination processing unit 331 performs processing related to determination as to whether or not to permit sales of a ticket to a purchaser. The imaging permission seat map supply unit 332 performs processing related to supply of an imaging permission seat map which is map information indicating an area (seat) where an imaging action is permitted. The electronic signature processing unit 333 performs processing related to an electronic signature of a content such as a captured image. The ticket information verification unit 334 performs processing related to verification of ticket information. The copyright information association unit 335 performs processing related to association of copyright information with the content such as a captured image.

<Imaging Monitoring Device>

Figure 8:
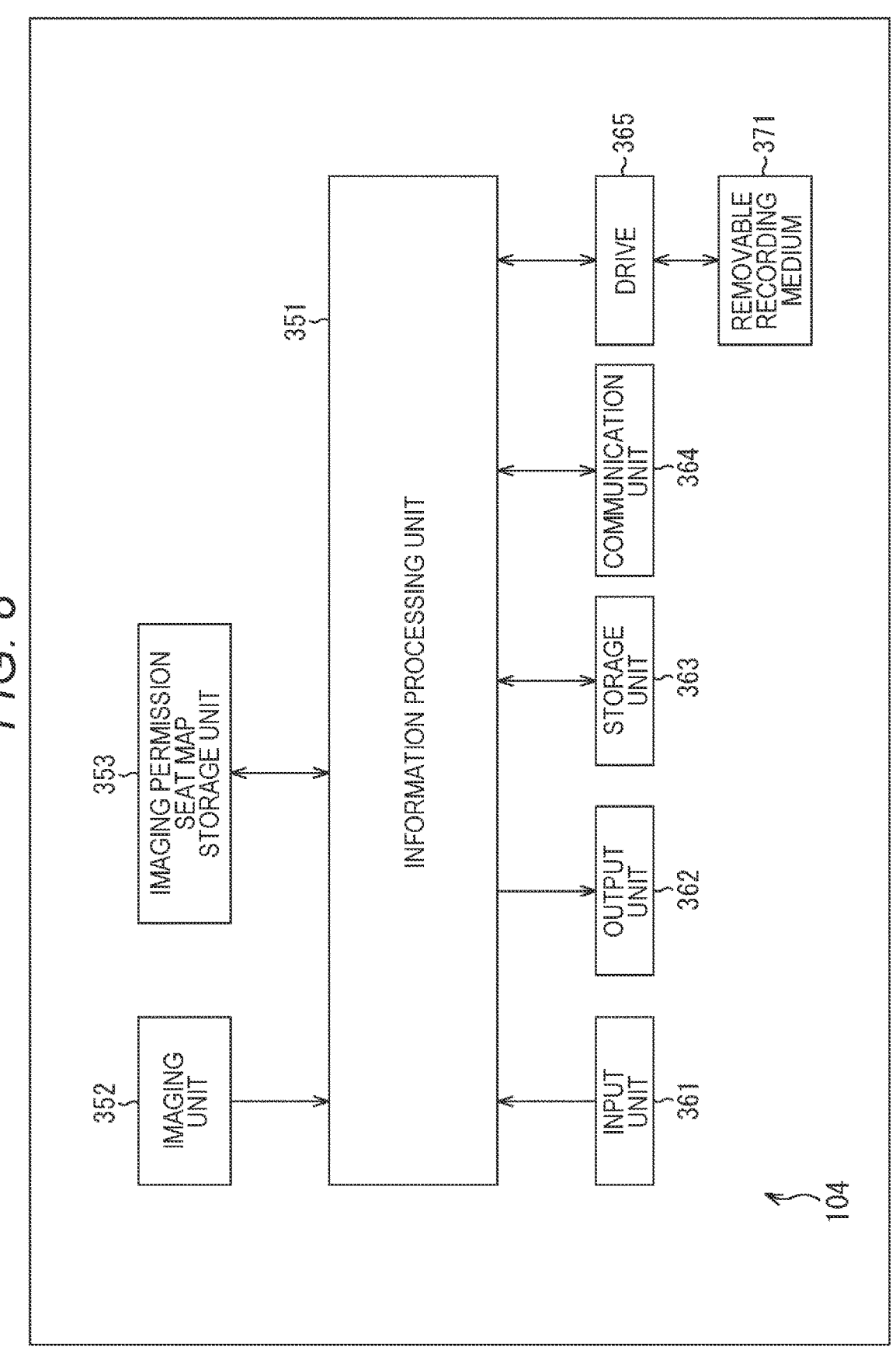
FIG. 8 is a block diagram illustrating a main configuration example of an imaging device monitoring device.

FIG. 8 is a diagram illustrating a main configuration example of the imaging monitoring device 104 which is an embodiment of the information processing device to which the present technology is applied. As illustrated in FIG. 8, the imaging monitoring device 104 includes an information processing unit 351, an imaging unit 352, an imaging permission seat map storage unit 353, an input unit 361, an output unit 362, a storage unit 363, a communication unit 364, and a drive 365.

The information processing unit 351 is a computer that includes, for example, a CPU, a ROM, a RAM, and the like, and can implement various functions by executing application programs (software) using them. For example, the information processing unit 351 can install and execute an application program (software) or the like that performs processing related to monitoring of imaging actions in an event venue. Here, the computer includes a computer built in dedicated hardware, and, for example, a general-purpose personal computer, a portable information processing terminal, and the like capable of executing various functions by installing various programs, and the like.

The imaging unit 352 includes an optical system, an image sensor, and the like, and can capture an image of a subject to generate the captured image. The imaging unit 352 can supply the generated captured image to the information processing unit 351.

The imaging permission seat map storage unit 353 includes a storage medium such as a hard disk, a RAM disk, or a non-volatile memory, and can store an imaging permission seat map, for example.

The input unit 361 includes input devices, for example, a keyboard, a mouse, a microphone, a touch panel, an input terminal, and the like and can supply information input via these input devices to the information processing unit 351.

The output unit 362 includes output devices, for example, a display (display unit), a speaker (audio output unit), an output terminal, and the like and can output the information supplied from the information processing unit 351 via these output devices.

The storage unit 363 includes a storage medium, for example, a hard disk, a RAM disk, a non-volatile memory, or the like and can store the information supplied from the information processing unit 351 in the storage medium. The storage unit 363 can read information stored in the storage medium and supply the information to the information processing unit 351.

The communication unit 364 includes, for example, a network interface and can receive information transmitted from another device and supply the received information to the information processing unit 351. The communication unit 364 can transmit information supplied from the information processing unit 351 to another device.

The drive 365 has an interface of a removable recording medium 371, such as a magnetic disk, an optical disk, a magneto-optical disk, or a semiconductor memory, and can read information recorded in the removable recording medium 371 attached to the drive itself and supply the information to the information processing unit 351. The drive 365 can record information supplied from the information processing unit 351 in the removable recording medium 371 which has been attached to the drive itself and to which writing is possible.

For example, the information processing unit 351 loads and executes an application program stored in the storage unit 363. At that time, the information processing unit 351 can appropriately store data and the like necessary for executing various types of processing. The application program, the data, and the like can be provided in the state of being recorded in the removable recording medium 371 as package media or the like, for example. In such a case, the application program, the data, and the like are read by the drive 365 to which the removable recording medium 371 is attached, and are installed in the storage unit 363 via the information processing unit 351. Furthermore, the application program can also be provided via a wired or wireless transmission medium such as a local area network, the Internet, or digital satellite broadcasting. In such a case, the application program, the data, and the like are received by the communication unit 364 and installed in the storage unit 363 via the information processing unit 351. Furthermore, the application program, the data, and the like can be installed in advance in the ROM or the storage unit 363 in the information processing unit 351.

<Functional Blocks of Imaging Monitoring Device>

Figure 9:
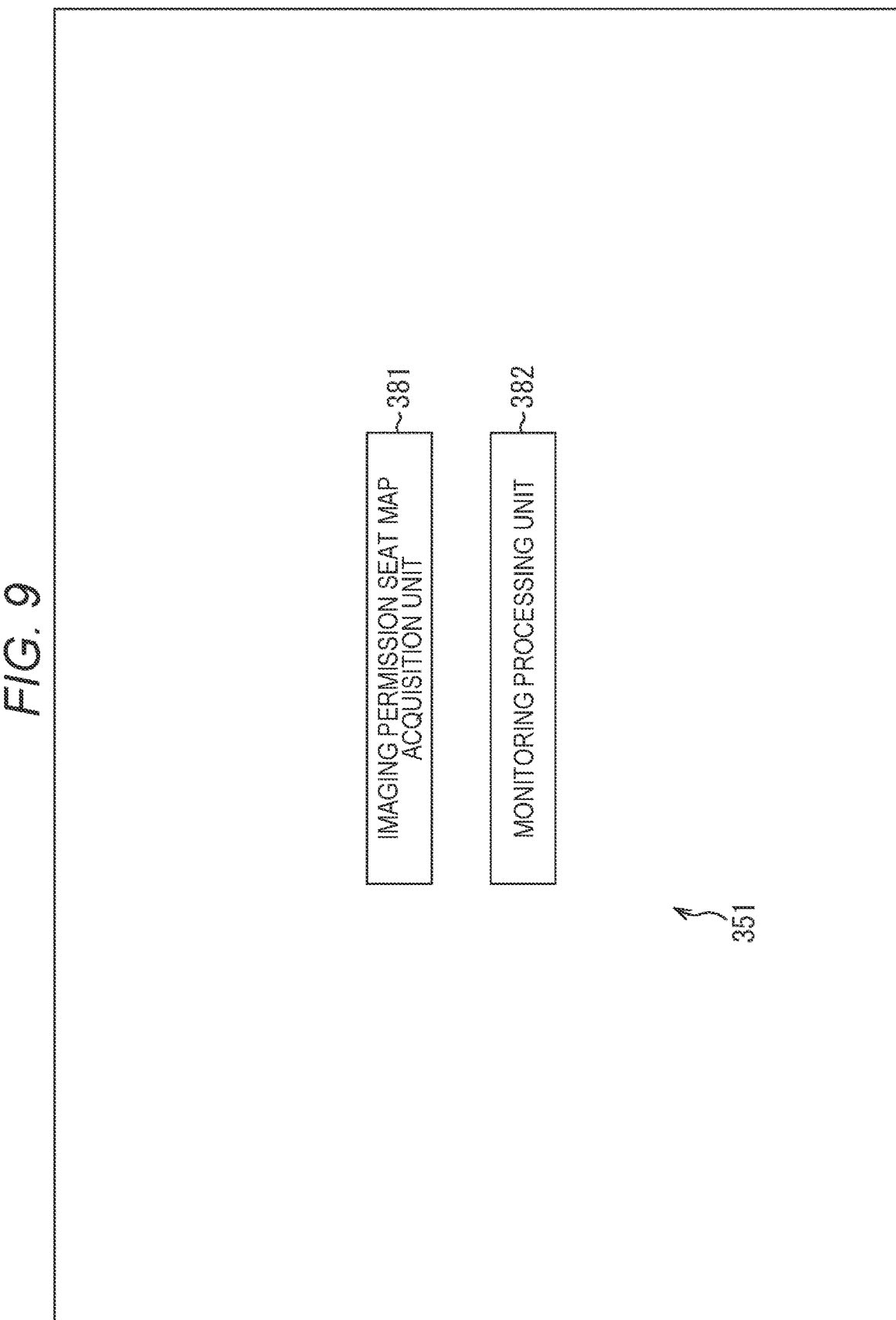
FIG. 9 is a functional block diagram illustrating functions implemented in the imaging device monitoring device.

Functions implemented as the information processing unit 351 executes application programs are illustrated in FIG. 9 as functional blocks. As illustrated in FIG. 9, the information processing unit 351 can include an imaging permission seat map acquisition unit 381 and a monitoring processing unit 382.

The imaging permission seat map acquisition unit 381 performs processing related to acquisition of an imaging permission seat map. The monitoring processing unit 382 performs processing related to monitoring of an imaging action.

<Posting Site Server>

Figure 10:
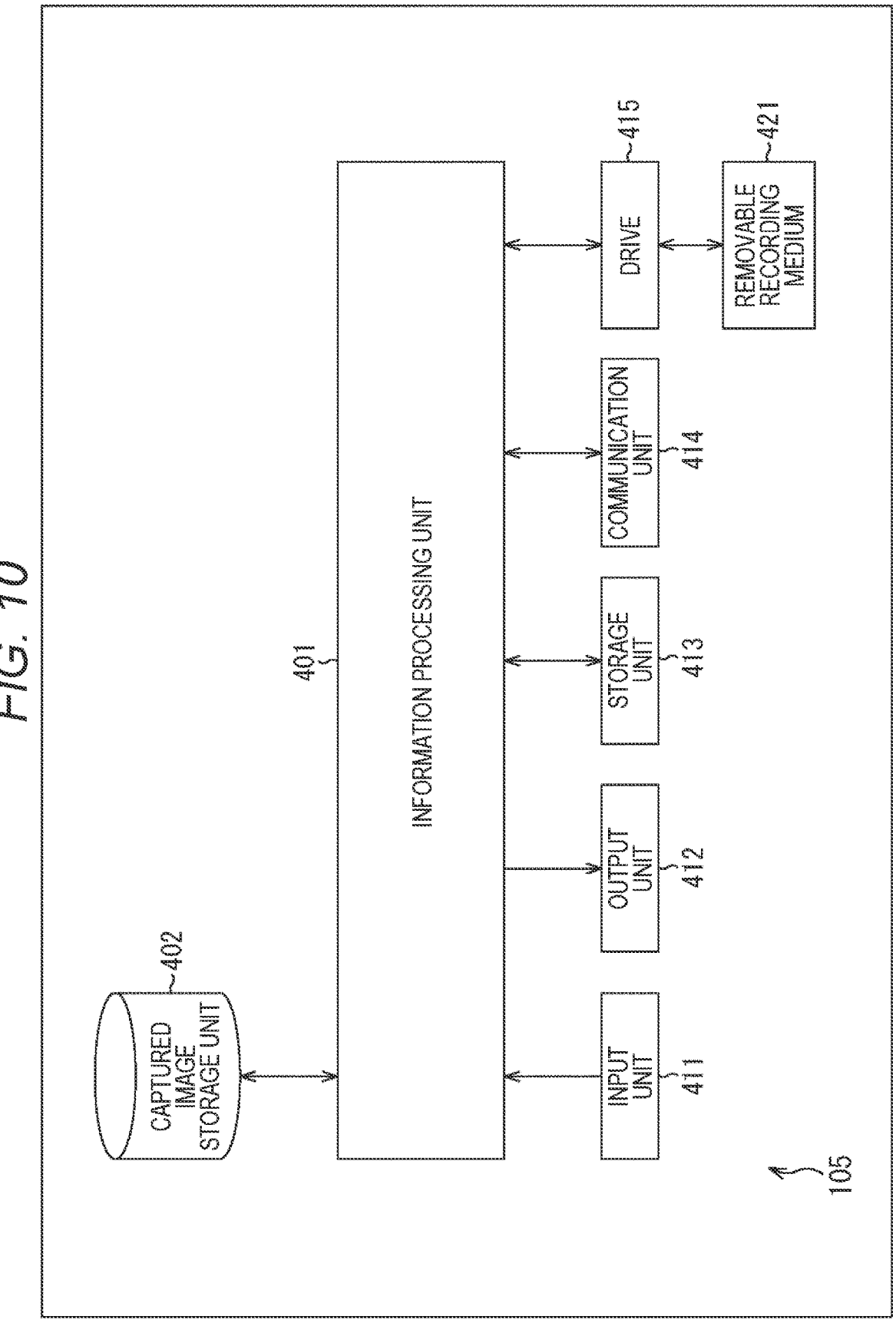
FIG. 10 is a block diagram illustrating a main configuration example of a posting site server.

FIG. 10 is a diagram illustrating a main configuration example of the posting site server 105 which is an embodiment of the information processing device to which the present technology is applied. As illustrated in FIG. 10, the posting site server 105 includes an information processing unit 401, a captured image storage unit 402, an input unit 411, an output unit 412, a storage unit 413, a communication unit 414, and a drive 415.

The information processing unit 401 is a computer that includes, for example, a CPU, a ROM, a RAM, and the like, and can implement various functions by executing application programs (software) using them. For example, the information processing unit 401 can install and execute an application program (software) or the like that performs processing related to posting and release of a captured image. Here, the computer includes a computer built in dedicated hardware, and, for example, a general-purpose personal computer, a portable information processing terminal, and the like capable of executing various functions by installing various programs, and the like.

The captured image storage unit 402 includes a storage medium such as a hard disk, a RAM disk, or a non-volatile memory, and can store the posted captured image, for example.

The input unit 411 includes input devices, for example, a keyboard, a mouse, a microphone, a touch panel, an input terminal, and the like and can supply information input via these input devices to the information processing unit 401.

The output unit 412 includes output devices, for example, a display (display unit), a speaker (audio output unit), an output terminal, and the like and can output the information supplied from the information processing unit 401 via these output devices.

The storage unit 413 includes a storage medium, for example, a hard disk, a RAM disk, a non-volatile memory, or the like and can store the information supplied from the information processing unit 401 in the storage medium. The storage unit 413 can read information stored in the storage medium and supply the information to the information processing unit 401.

The communication unit 414 includes, for example, a network interface and can receive information transmitted from another device and supply the received information to the information processing unit 401. The communication unit 414 can transmit information supplied from the information processing unit 401 to another device.

The drive 415 has an interface of a removable recording medium 421, such as a magnetic disk, an optical disk, a magneto-optical disk, or a semiconductor memory, and can read information recorded in the removable recording medium 421 attached to the drive itself and supply the information to the information processing unit 401. The drive 415 can record information supplied from the information processing unit 401 in the removable recording medium 421 which has been attached to the drive itself and to which writing is possible.

For example, the information processing unit 401 loads and executes an application program stored in the storage unit 413. At that time, the information processing unit 401 can appropriately store data and the like necessary for executing various types of processing. The application program, the data, and the like can be provided in the state of being recorded in the removable recording medium 421 as package media or the like, for example. In such a case, the application program, the data, and the like are read by the drive 415 to which the removable recording medium 421 is attached, and are installed in the storage unit 413 via the information processing unit 401. Furthermore, the application program can also be provided via a wired or wireless transmission medium such as a local area network, the Internet, or digital satellite broadcasting. In such a case, the application program, the data, and the like are received by the communication unit 414 and installed in the storage unit 413 via the information processing unit 401. Furthermore, the application program, the data, and the like can be installed in advance in the ROM or the storage unit 413 in the information processing unit 401.

<Functional Blocks of Posting Site Server>

Figure 11:
FIG. 11 is a functional block diagram illustrating functions implemented in the posting site server.

Functions implemented as the information processing unit 401 executes application programs are illustrated in FIG. 11 as functional blocks. As illustrated in FIG. 11, the information processing unit 401 can include a posting reception unit 431, a captured image verification unit 432, and a captured image release unit 433.

The posting reception unit 431 performs processing related to reception of posting of a captured image. The captured image verification unit 432 performs processing related to verification of the posted captured image. The captured image release unit 433 performs processing related to release of the posted captured image.

<Viewer Terminal Device>

Figure 12:
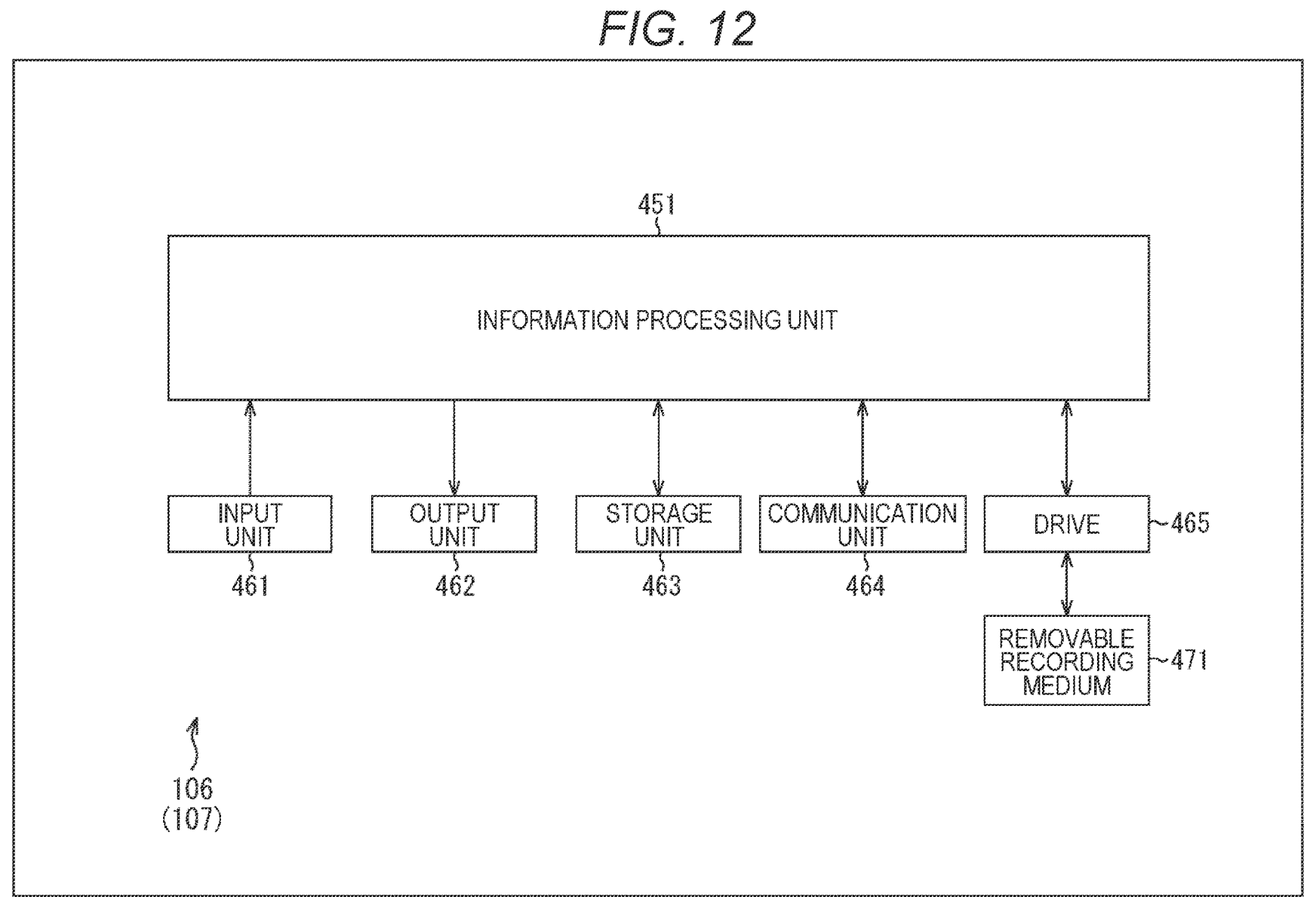

FIG. 12 is a diagram illustrating a main configuration example of the viewer A terminal device 106 which is an embodiment of the information processing device to which the present technology is applied. As illustrated in FIG. 12, the viewer A terminal device 106 includes an information processing unit 451, an input unit 461, an output unit 462, a storage unit 463, a communication unit 464, and a drive 465.

The information processing unit 451 is a computer that includes, for example, a CPU, a ROM, a RAM, and the like, and can implement various functions by executing application programs (software) using them. For example, the information processing unit 451 can install and execute an application program (software) or the like that performs processing related to acquisition or the like of a released captured image. Here, the computer includes a computer built in dedicated hardware, and, for example, a general-purpose personal computer, a portable information processing terminal, and the like capable of executing various functions by installing various programs, and the like.

The input unit 461 includes input devices, for example, a keyboard, a mouse, a microphone, a touch panel, an input terminal, and the like and can supply information input via these input devices to the information processing unit 451.

The output unit 462 includes output devices, for example, a display (display unit), a speaker (audio output unit), an output terminal, and the like and can output the information supplied from the information processing unit 451 via these output devices.

The storage unit 463 includes a storage medium, for example, a hard disk, a RAM disk, a non-volatile memory, or the like and can store the information supplied from the information processing unit 451 in the storage medium. The storage unit 463 can read information stored in the storage medium and supply the information to the information processing unit 451.

The communication unit 464 includes, for example, a network interface and can receive information transmitted from another device and supply the received information to the information processing unit 451. The communication unit 464 can transmit information supplied from the information processing unit 451 to another device.

The drive 465 has an interface of a removable recording medium 471, such as a magnetic disk, an optical disk, a magneto-optical disk, or a semiconductor memory, and can read information recorded in the removable recording medium 471 attached to the drive itself and supply the information to the information processing unit 451. The drive 465 can record information supplied from the information processing unit 451 in the removable recording medium 471 which has been attached to the drive itself and to which writing is possible.

For example, the information processing unit 451 loads and executes an application program stored in the storage unit 463. At that time, the information processing unit 451 can appropriately store data and the like necessary for executing various types of processing. The application program, the data, and the like can be provided in the state of being recorded in the removable recording medium 471 as package media or the like, for example. In such a case, the application program, the data, and the like are read by the drive 465 to which the removable recording medium 471 is attached, and are installed in the storage unit 463 via the information processing unit 451. Furthermore, the application program can also be provided via a wired or wireless transmission medium such as a local area network, the Internet, or digital satellite broadcasting. In such a case, the application program, the data, and the like are received by the communication unit 464 and installed in the storage unit 463 via the information processing unit 451. Furthermore, the application program, the data, and the like can be installed in advance in the ROM or the storage unit 463 in the information processing unit 451.

Note that the viewer B terminal device 107 also has a configuration similar to that of the viewer A terminal device 106. That is, the block diagram of FIG. 12 can also be applied to description of a configuration of the viewer B terminal device 107. Hereinafter, the viewer A terminal device 106 and the viewer are referred to as a viewer terminal device in a case where it is not necessary to distinguish them for description.

<Functional Blocks of Viewer A Terminal Device>

Figure 13:
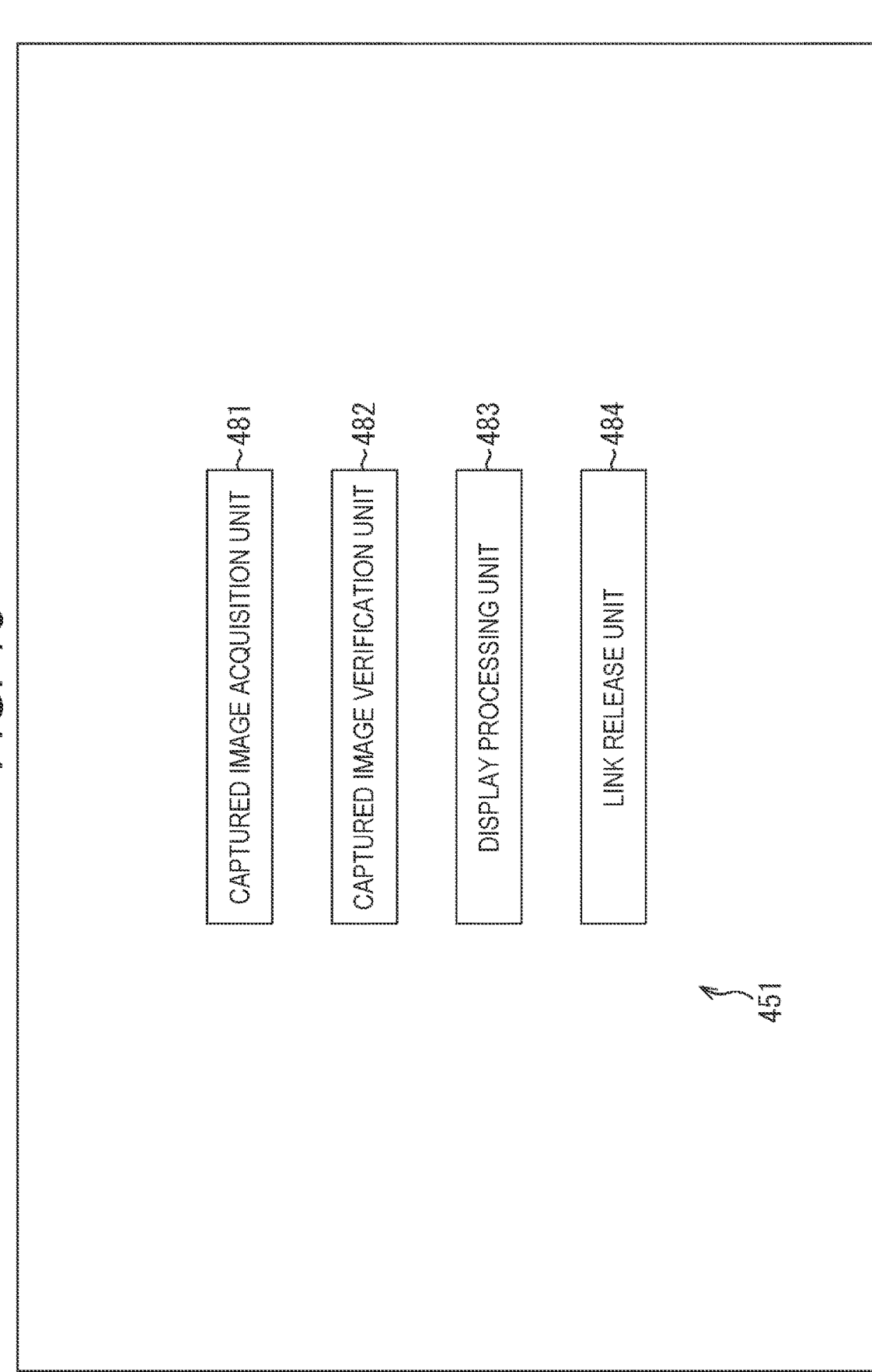
FIG. 13 is a functional block diagram illustrating functions implemented in a viewer A terminal device.

Functions implemented as the information processing unit 451 of the viewer A terminal device 106 executes application programs are illustrated in FIG. 13 as functional blocks. As illustrated in FIG. 13, the information processing unit 451 can include a captured image acquisition unit 481, a captured image verification unit 482, a display processing unit 483, and a link release unit 484.

The captured image acquisition unit 481 performs processing related to acquisition of a captured image. The captured image verification unit 482 performs processing related to verification of the acquired captured image. The display processing unit 483 performs processing related to display of the captured image. The link release unit 484 performs processing related to release of a link of a public address of the captured image.

<Functional Blocks of Viewer B Terminal Device>

Figure 14:
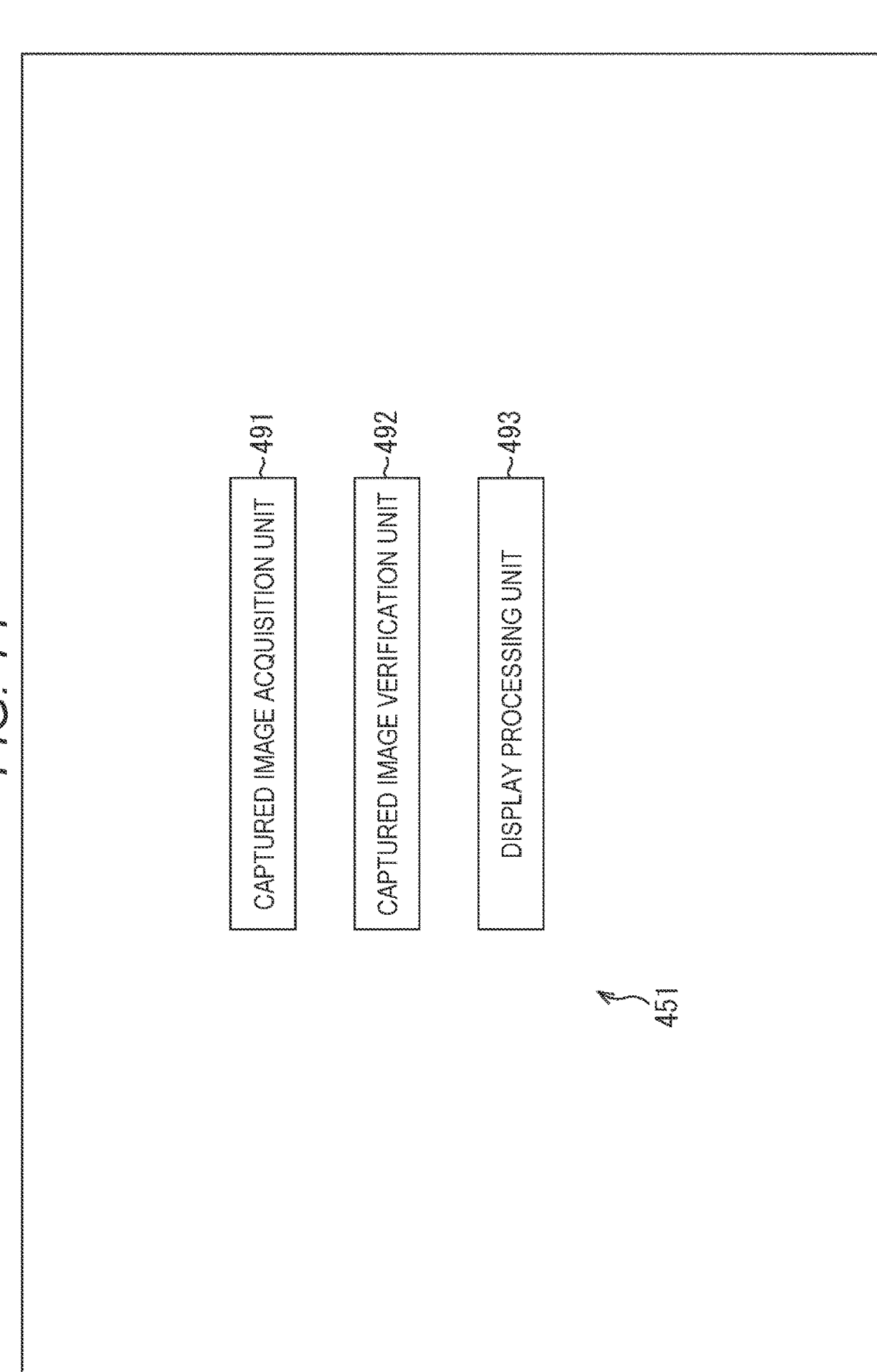
FIG. 14 is a functional block diagram illustrating functions implemented in a viewer B terminal device.

Functions implemented as the information processing unit 451 of the viewer B terminal device 107 executes application programs are illustrated in FIG. 14 as functional blocks. As illustrated in FIG. 14, the information processing unit 451 can include a captured image acquisition unit 491, a captured image verification unit 492, and a display processing unit 493.

The captured image acquisition unit 491 performs processing related to acquisition of a captured image. The captured image verification unit 492 performs processing related to verification of the acquired captured image. The display processing unit 493 performs processing related to display of the captured image.

<Flow of Ticket Sales Processing>

Figure 15:
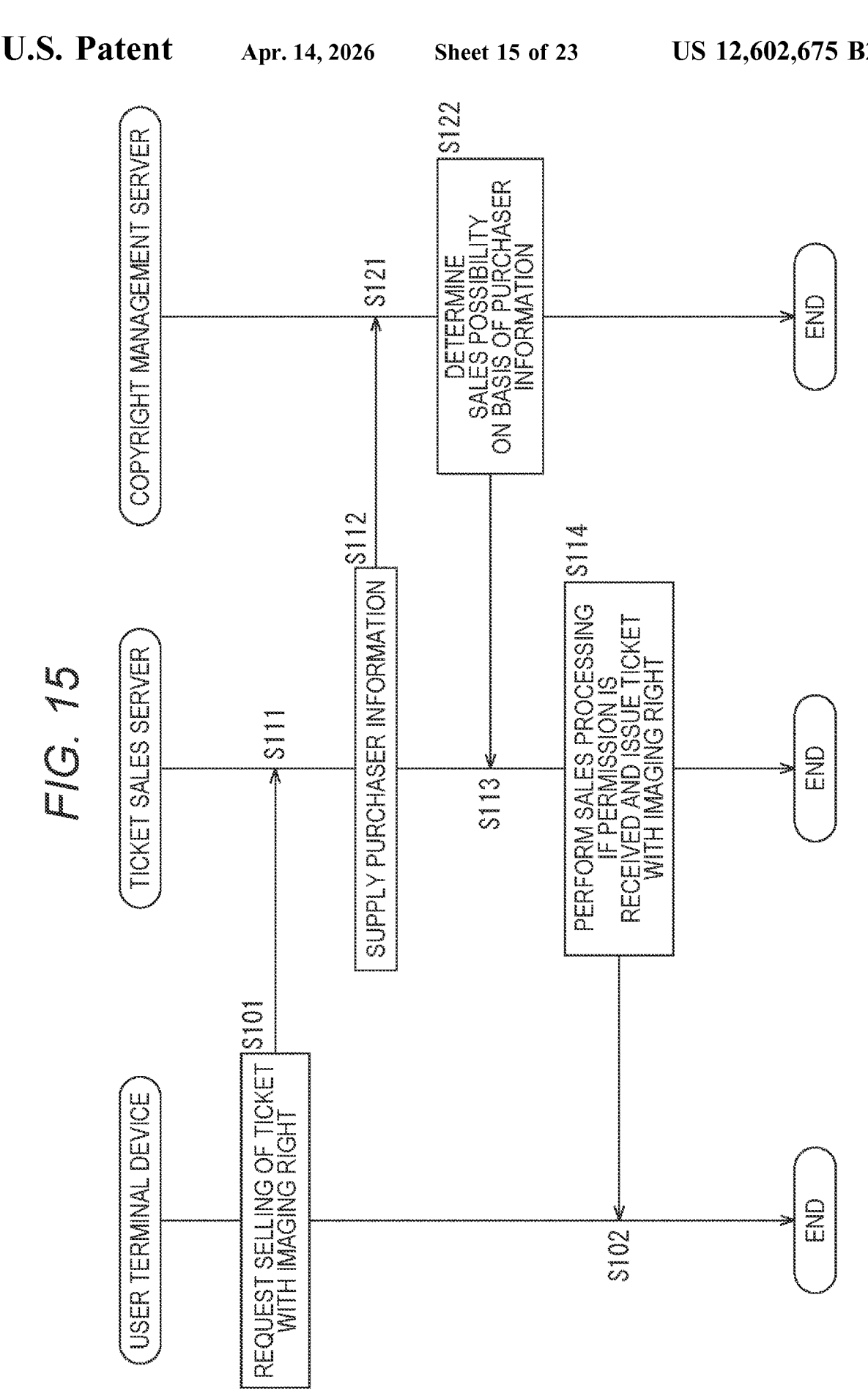
FIG. 15 is a flowchart illustrating an example of a flow of ticket sales processing.

In order for the user of the user terminal device 101 to purchase a ticket with an imaging right, the user terminal device 101, the ticket sales server 102, and the copyright management server 103 perform ticket sales processing, and perform processes with the arrows 111 to 114 in FIG. 1. An example of a flow of the ticket sales processing will be described with reference to a flowchart of FIG. 15.

For example, when the ticket sales processing is started as the user instructs to purchase the ticket with the imaging right or the like, the ticket purchase processing unit 231 of the user terminal device 101 performs a procedure for purchasing the ticket with the imaging right in step S101. For example, the ticket purchase processing unit 231 controls the communication unit 214 to supply purchaser information, which is information regarding the user who purchases the ticket with the imaging right, to the ticket sales server 102, thereby requesting sales of the ticket with the imaging right. In step S111, the ticket sales processing unit 281 of the ticket sales server 102 receives the request via the communication unit 264. That is, the ticket sales processing unit 281 acquires the purchaser information supplied from the user terminal device 101.

When the request is received, the purchaser information confirmation unit 282 controls the communication unit 264 to supply the purchaser information to the copyright management server 103 in step S112, thereby requesting confirmation of the purchaser (user). In step S121, the sales possibility determination processing unit 331 of the copyright management server 103 receives the request via the communication unit 314. That is, the sales possibility determination processing unit 331 acquires the purchaser information supplied from the ticket sales server 102.

In step S122, the sales possibility determination processing unit 331 determines whether or not the ticket with the imaging right can be sold on the basis of the acquired purchaser information. For example, the sales possibility determination processing unit 331 refers to information such as a history of illegal actions stored in the purchaser information storage unit 302 to determine whether or not the user (that is, the user requesting the purchase of the ticket with the imaging right) corresponding to the acquired purchaser information has committed fraud in the past, and determines whether or not to permit sales of the ticket with the imaging right to the user on the basis of the determination result. On the basis of the determination result, the sales possibility determination processing unit 331 controls the communication unit 314, and supplies permission information, which is control information indicating whether or not to permit the sales, to the ticket sales server 102. Furthermore, in a case where the sales are permitted, the sales possibility determination processing unit 331 may read out sales information, which is information regarding the sales of the ticket, from the sales information storage unit 303, control the communication unit 314, and supply the sales information to the ticket sales server 102. Details of the sales information are arbitrary. For example, a date and time corresponding to the ticket may be included, a seat corresponding to the ticket may be included, or other conditions corresponding to the ticket may be included. Furthermore, a price of the ticket may be included, or a payment method for the ticket price may be included. Of course, other information may be included. Furthermore, some or all of these pieces of information (for example, the date and time corresponding to the ticket, the seat, and the other conditions, the price of the ticket, the payment method for the price, and the like) may be determined on the basis of a result (for example, a ticket purchase history, an illegal act history, and the like of the user) of the determination processing on the possibility of sales. In step S113, the purchaser information confirmation unit 282 of the ticket sales server 102 acquires these pieces of information via the communication unit 264.

In step S114, the ticket sales processing unit 281 performs a sales procedure on the basis of the permission information supplied from the copyright management server 103. For example, in a case where the sales are permitted by the copyright management server 103, the ticket sales processing unit 281 performs sales processing of the requested ticket with the imaging right to issue the ticket with the imaging right. That is, after payment processing or the like is performed, the ticket sales processing unit 281 controls the communication unit 264 to supply ticket information, which is information regarding the sold ticket, to the user terminal device 101. The ticket information includes at least a ticket identifier which is identification information of the ticket. In step S102, the ticket purchase processing unit 231 of the user terminal device 101 acquires the ticket information via the communication unit 214. The ticket purchase processing unit 231 supplies the ticket information to the ticket information storage unit 203 to be stored therein.

A ticket with an imaging right may be an electronic ticket or a paper ticket. FIG. 16 illustrates an example of the electronic ticket. In FIG. 16, an electronic ticket 601 is a ticket with an imaging right, and includes, for example, a ticket identifier 611, purchaser information 612, and imaging permission information 613.

The ticket identifier 611 is identification information for identifying the electronic ticket 601. For example, the ticket identifier 611 may be an identification number or may be information such as a seat, a venue, and a date as items corresponding to the electronic ticket 601. The purchaser information 612 is information regarding a purchaser who has purchased the electronic ticket 601. For example, the purchaser information 612 includes a purchaser identifier (for example, a membership number of a ticket sales service or the like) for identifying the purchaser (user). The imaging permission information 613 is information regarding an imaging action or the like to be permitted.

For example, the imaging permission information 613 can include an imaging-possible time zone condition indicating a time zone in which imaging is permitted, an imaging time length condition indicating a length of a permitted imaging time, an imaging count condition indicating a permitted number of times of imaging, an image size (resolution) condition indicating a permitted image size (resolution) of a captured image, a detail condition indicating permitted imaging details, for example, a size of an imaging target, a format condition indicating a format of a permitted content, and the like. The format condition can include, for example, an image format condition indicating permitted codec, compression rate, and the like of an image content, an audio format condition indicating permitted codec, sampling rate, and the like of an audio content, and the like.

Of course, information other than these examples may be included in the imaging permission information 613. Furthermore, these examples are not necessarily included in the imaging permission information 613.

In a case where a ticket with an imaging right is such an electronic ticket, the ticket sales processing unit 281 of the ticket sales server 102 supplies the electronic ticket to the ticket purchase processing unit 231 of the user terminal device 101 as ticket identification information.

Furthermore, in a case where a ticket with an imaging right is a paper ticket, the ticket sales processing unit 281 of the ticket sales server 102 supplies ticket information to the ticket purchase processing unit 231 of the user terminal device 101 as information for providing notification of completion of payment processing or the like.

Note that the ticket sales processing unit 281 may perform sales processing of the ticket with the imaging right on the basis of sales information supplied from the copyright management server 103. For example, the ticket sales processing unit 281 may sell a ticket with a date and time, a seat, and other conditions indicated in the sales information at a price and with a payment method indicated in the sales information. Furthermore, the ticket sales processing unit 281 may sell a ticket without acquiring sales information from the copyright management server 103. For example, the ticket sales processing unit 281 may determine a date and time, a seat, other conditions, a price, a payment method, and the like regarding a ticket to be sold. Furthermore, the ticket sales processing unit 281 may determine these on the basis of a request from the user terminal device 101. Of course, these techniques may be used in combination.

Furthermore, the ticket sales processing unit 281 also supplies sales information (for example, a date and time, a seat, and other conditions corresponding to a sold ticket, a price of the ticket, information regarding a purchaser of the ticket, a payment method for the price, and the like) on the sold ticket to the sales information storage unit 252 to be stored therein. This sales information may be used for subsequent sales processing, confirmation of purchaser information, and the like.

When the process of step S102 ends, the ticket sales processing is ended. It is possible to sell the ticket with the imaging right and supply the ticket information to the user terminal device 101 by executing the respective processes in this manner. That is, it is possible to manage the user who is permitted to acquire a content.

<Flow of Imaging Monitoring Processing>

Figure 17:
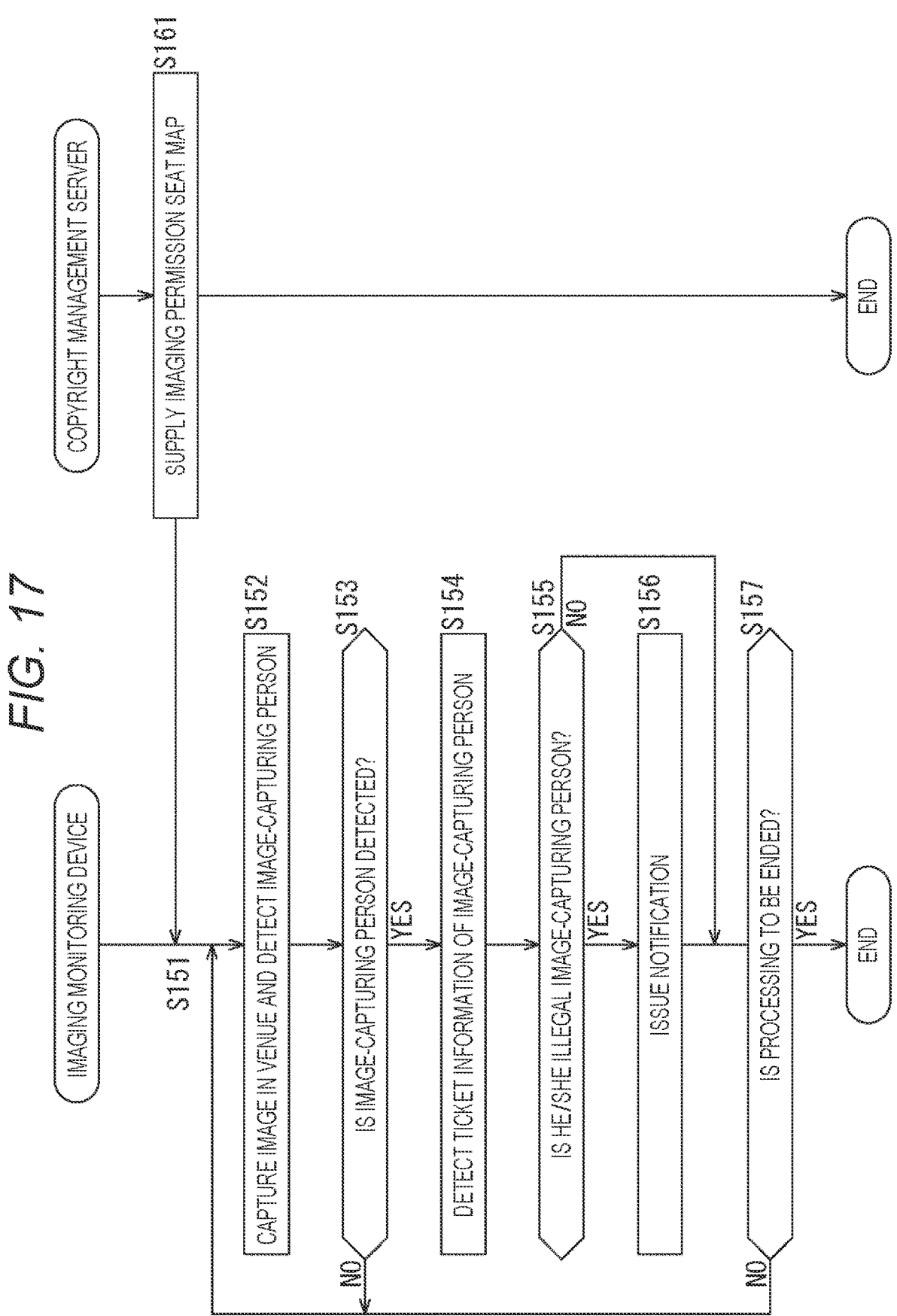
FIG. 17 is a flowchart illustrating an example of a flow of imaging monitoring processing.

In an event venue, the imaging monitoring device 104 monitors imaging actions of participants. An example of a flow of imaging monitoring processing in this case will be described with reference to a flowchart of FIG. 17.

When the imaging monitoring processing is started, in step S161, the imaging permission seat map supply unit 332 of the copyright management server 103 controls the communication unit 314 to supply an imaging permission seat map corresponding to the event venue to the imaging monitoring device 104. In step S151, the imaging permission seat map acquisition unit 381 of the imaging monitoring device 104 acquires the imaging permission seat map via the communication unit 364. The imaging permission seat map acquisition unit 381 stores the acquired imaging permission seat map in the imaging permission seat map storage unit 353.

In step S152, the monitoring processing unit 382 captures an image of the inside of the event venue using the imaging unit 352, and detects a photographer taking an imaging action from the captured image. In step S153, the monitoring processing unit 382 determines whether or not the photographer is detected. In a case where it is determined that the photographer is not detected, the processing returns to step S152. In a case where it is determined in step S153 that the photographer is detected, the processing proceeds to step S154.

In step S154, the monitoring processing unit 382 detects ticket information of the photographer. For example, the monitoring processing unit 382 may acquire the ticket information by controlling the communication unit 364 to communicate with the user terminal device 101 of a user who has purchased the ticket with an imaging function. Furthermore, the monitoring processing unit 382 may analyze the captured image to detect a position of a user taking an imaging action and detect ticket information printed on a paper ticket, a tag, or the like carried by the user.

In step S155, the monitoring processing unit 382 determines whether or not the photographer is an illegal photographer on the basis of the detection result and the imaging permission seat map. In a case where it is determined that the photographer is the illegal photographer, the monitoring processing unit 382 notifies the user terminal device 101 of a staff or the photographer, and the like that the photographer is illegal in step S156. When the process of step S156 ends, the processing proceeds to step S157. Furthermore, in a case where it is determined in step S155 that the photographer is a valid photographer, the processing proceeds to step S157.

In step S157, the monitoring processing unit 382 determines whether or not to end the imaging monitoring processing. In a case where it is determined not to end the processing, the processing returns to step S152. In a case where it is determined to end the processing, the imaging monitoring processing ends.

The imaging monitoring device 104 can easily monitor the imaging action by executing the respective processes as described above. That is, the content acquisition can be managed.

<Flow of Imaging Control Processing>

Figure 18:
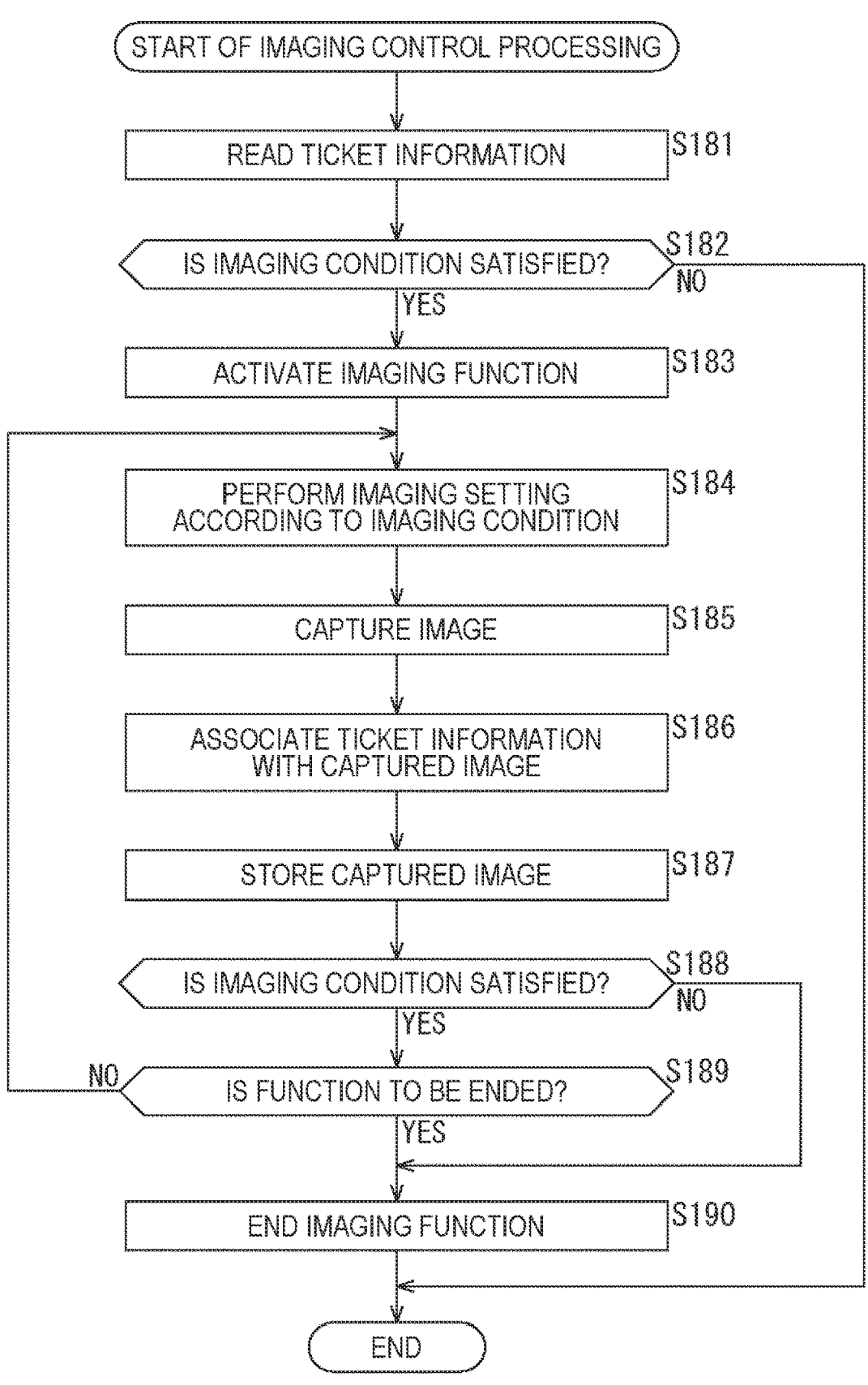
FIG. 18 is a flowchart illustrating an example of a flow of imaging control processing.

The user terminal device 101 executes imaging control processing in an imaging permission area (for example, a seat designated by a ticket with an imaging right or the like) in an event venue, and performs imaging according to an operation of a user. An example of a flow of the imaging control processing in this case will be described with reference to a flowchart of FIG. 18.

When the imaging processing is started, the imaging control unit 232 reads ticket information stored in the ticket information storage unit 203 in step S181. In step S182, the imaging control unit 232 determines whether or not an imaging condition indicated in the ticket information is satisfied. In a case where it is determined that the imaging condition is satisfied, the processing proceeds to step S183.

In step S183, the imaging control unit 232 activates an imaging function.

In step S184, the imaging control unit 232 performs imaging setting according to the imaging condition indicated in the ticket information.

In step S185, the imaging control unit 232 controls the imaging unit 202 to capture an image of a subject and generate the captured image. In step S186, the imaging control unit 232 associates the ticket information with the captured image. In step S187, the imaging control unit 232 stores the captured image and the ticket information associated with each other in the captured image storage unit 204.

In step S188, the imaging control unit 232 determines whether or not the imaging condition indicated in the ticket information is satisfied. In a case where it is determined that the imaging condition is satisfied, the processing proceeds to step S189. In step S189, the imaging control unit 232 determines whether or not to end the imaging. In a case where it is determined not to end the imaging, the processing returns to step S184, and processes in step S184 and subsequent steps are repeated.

Furthermore, in a case where it is determined in step S189 to end the imaging, for example, according to an operation of the user or the like, the processing proceeds to step S189. Furthermore, in a case where it is determined in step S188 that the imaging condition is not satisfied, for example, because the number of times of imaging exceeds the condition or the like, the processing proceeds to step S190.

In step S190, the imaging control unit 232 ends the imaging function. In a case where the process of step S190 ends, the imaging control processing is ended. Furthermore, in a case where it is determined in step S182 that the imaging condition is not satisfied, the imaging control processing is ended.

The imaging based on the ticket information can be performed by executing the respective processes as described above. That is, the content acquisition can be managed using the ticket information.

<Flow of Electronic Signature Processing>

Figure 19:
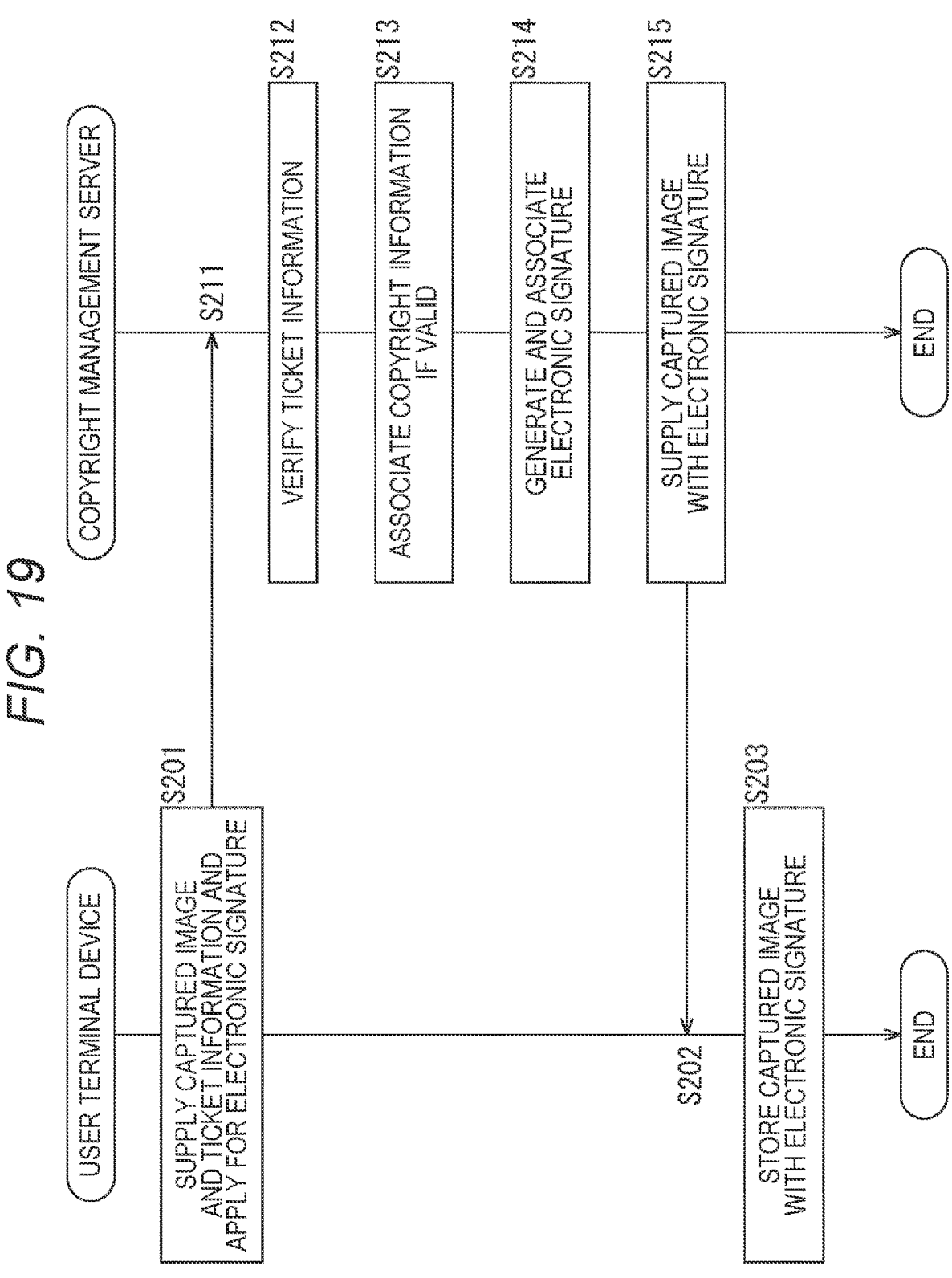
FIG. 19 is a flowchart illustrating an example of a flow of electronic signature processing.

When a captured image is generated according to ticket information, the user terminal device 101 and the copyright management server 103 perform electronic signature processing that is processing of associating an electronic signature and copyright information with the captured image. An example of a flow of the electronic signature processing will be described with reference to a flowchart of FIG. 19.

When the electronic signature processing is started, in step S201, the electronic signature processing unit 233 of the user terminal device 101 controls the communication unit 214 to read a desired captured image from the captured image storage unit 204 and read ticket information corresponding to the captured image from the ticket information storage unit 203 (alternatively, read desired ticket information from the ticket information storage unit 203 and read a captured image corresponding to the ticket information from the captured image storage unit 204), supplies the read captured image and ticket information to the copyright management server 103 to apply for an electronic signature. In step S211, the electronic signature processing unit 333 of the copyright management server 103 receives such an application via the communication unit 314.

In step S212, the ticket information verification unit 334 verifies the acquired ticket information. In a case where the ticket information is valid, the copyright information association unit 335 generates copyright information corresponding to the captured image in step S213, and associates the generated copyright information, as metadata, with the captured image. At that time, the electronic signature processing unit 333 may read copyright information stored in the copyright information storage unit 304 and generate the copyright information to be associated with the captured image by using the read copyright information. Furthermore, in step S214, the electronic signature processing unit 333 generates an electronic signature corresponding to the captured image and the metadata, and associates the generated electronic signature with the captured image to generate the captured image with the electronic signature.

Figure 20:
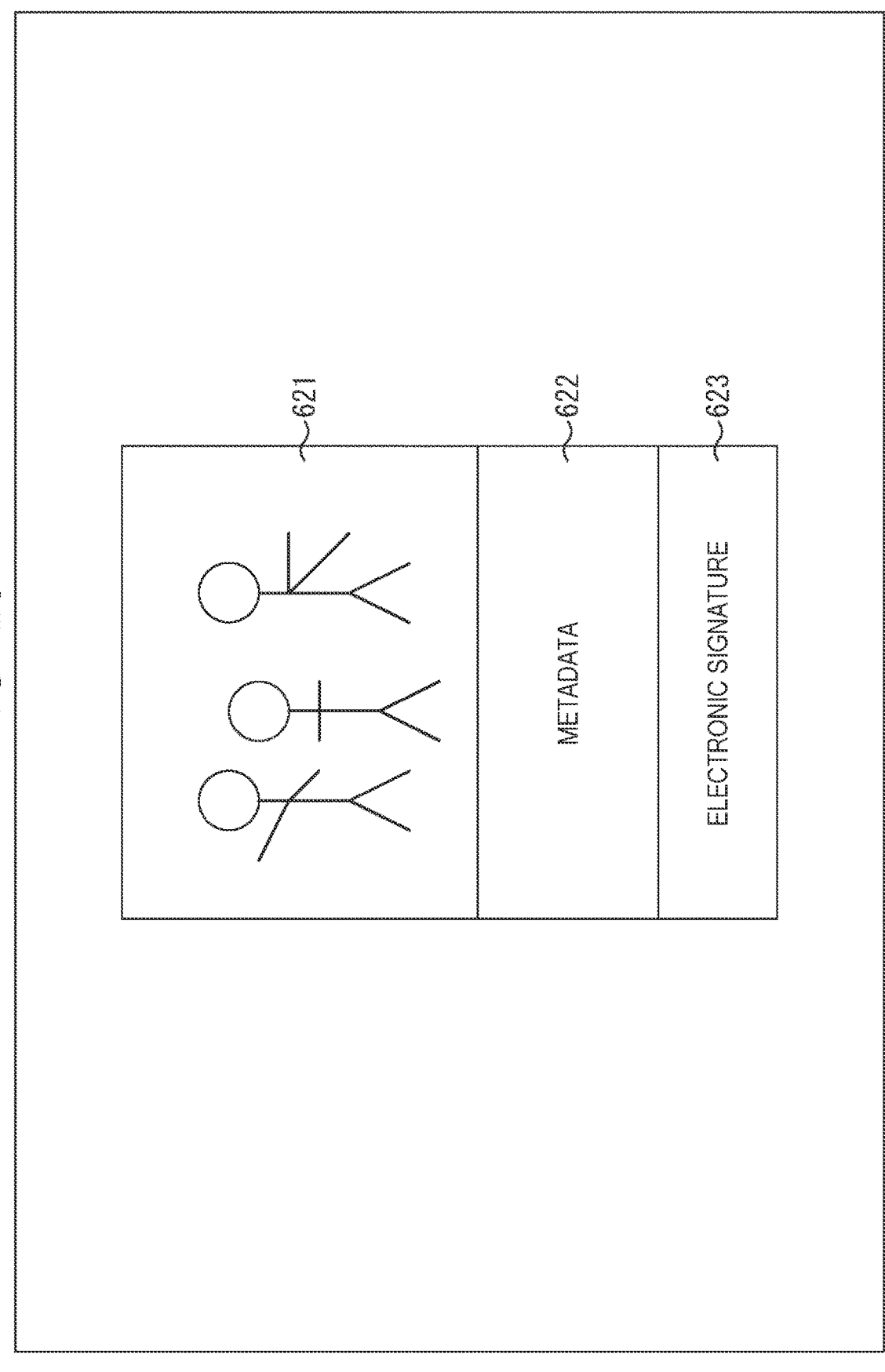
FIG. 20 is a diagram illustrating an example of a captured image with an electronic signature.

A configuration example of the captured image with the electronic signature is illustrated in FIG. 20. As illustrated in FIG. 20, a captured image 621 is associated with metadata 622 and an electronic signature 623 to generate a captured image with an electronic signature. The metadata 622 includes copyright information corresponding to the captured image 621. An example of the copyright information is illustrated in FIG. 21.

The copyright information includes at least any one of content use information that is information regarding use of a content, content generation information (for example, Event an Location in FIG. 21) that is information regarding generation of the content, content right holder information (for example, Contact Info in FIG. 21) that is information regarding a right holder of the content or license information (for example, Licensing in FIG. 21) that is information regarding a license. Note that the license information can include a ticket identifier.

The content use information includes at least any one of content provision information (for example, Image Rights in FIG. 21) that is information regarding provision of the content or content duplication/processing information (for example, Special Instruction in FIG. 21) that is information regarding duplication or processing of the content.

The content provision information can include at least any one of a content provision period condition (Releasedate or Expirationdate, or both) that is a condition related to a period for which the content is to be provided or a content provision condition (Rights Usage Terms) that is a condition related to provision of the content. The content provision condition can include at least any one of a content provision destination condition that is a condition related to a content provision destination or a content provision purpose condition that is a condition related to a purpose of providing the content. Furthermore, the content provision information can include information, such as a copyright notice (Copyright Notice) and a copyright information URL (Copyright Info URL), presented when the content is used. Furthermore, the content provision information can include creator information (Creator/Photographer) indicating a content producer (for example, in the case of a captured image, a user who has captured an image). The creator information may be, for example, a ticket identifier of a ticket with an imaging right purchased by the creator.

The content duplication/processing information can include at least any one of a content duplication method condition that is a condition related to a method for duplicating the content or a content processing method condition that is a condition related to a method for processing the content.

The content duplication method condition can include at least any one of a content unprocessed duplication condition that is a condition related to unprocessed duplication of the content or a content link generation condition that is a condition related to generation of a link of the content (Unprocessed copy/link is permitted).

The content processing method condition can include at least any one of a size/aspect ratio change condition that is a condition related to a change of a size or an aspect ratio of an image included in the content (Size/length change (only cropping) is permitted), an edited image superimposition condition that is a condition related to superimposition of an edited image on an image included in the content (Caption addition is permitted), a color change condition that is a condition related to a change of a color of an image included in the content (Color processing is permitted), an other image combination condition that is a condition related to combination of an image included in the content and another image (Combination with another image is permitted), an audio processing condition that is a condition related to processing of audio included in the content (Audio processing is permitted), or a format change condition that is a condition related to a change of a format of the content (Image/audio format conversion is permitted). These conditions are applied, for example, in secondary use of the content and the like.

The content generation information can include at least any one of event information (Event) that is information regarding an event where the content has been acquired (generated) or location information (City, Sublocation, Province/State, Country, and the like) that is information indicating a location where the content has been acquired (generated).

The content right holder information can include contact information (City, State/Province, Postal Code, Country, Email(s), Phone(s), Web URL(s), and the like) that is information indicating a contact of a right holder (for example, an event sponsor, a copyright administrator, or the like) of the content.

The license information can include at least any one of copyright owner information (Copyright owner) that is information indicating a copyright owner or creator information (Image creator) that is information regarding a user who has obtained (generated) the content. The creator information may be, for example, a ticket identifier of a ticket with an imaging right purchased by the creator.

Referring back to FIG. 19, in step S215, the electronic signature processing unit 333 controls the communication unit 314 to supply the captured image with the electronic signature to the user terminal device 101. In step S202, the electronic signature processing unit 233 of the user terminal device 101 acquires the captured image with the electronic signature via the communication unit 214.

In step S203, the electronic signature processing unit 233 stores the captured image with the electronic signature in the captured image storage unit 204. When the process of step S203 ends, the electronic signature processing is ended.

The copyright information and the electronic signature can be associated with the captured image by executing the respective processes as described above. Therefore, the use of the content can be managed on the basis of these pieces of information.

Note that the content acquisition may be performed by a device other than the user terminal device 101. For example, a captured image may be generated by an imaging device other than the user terminal device 101 (that is, a user may perform imaging using the imaging device other than the user terminal device 101), and the user terminal device 101 may acquire the captured image from the imaging device and execute the electronic signature processing on the acquired captured image as in the example of FIG. 19.

<Flow of Content Use Processing>

Figure 22:
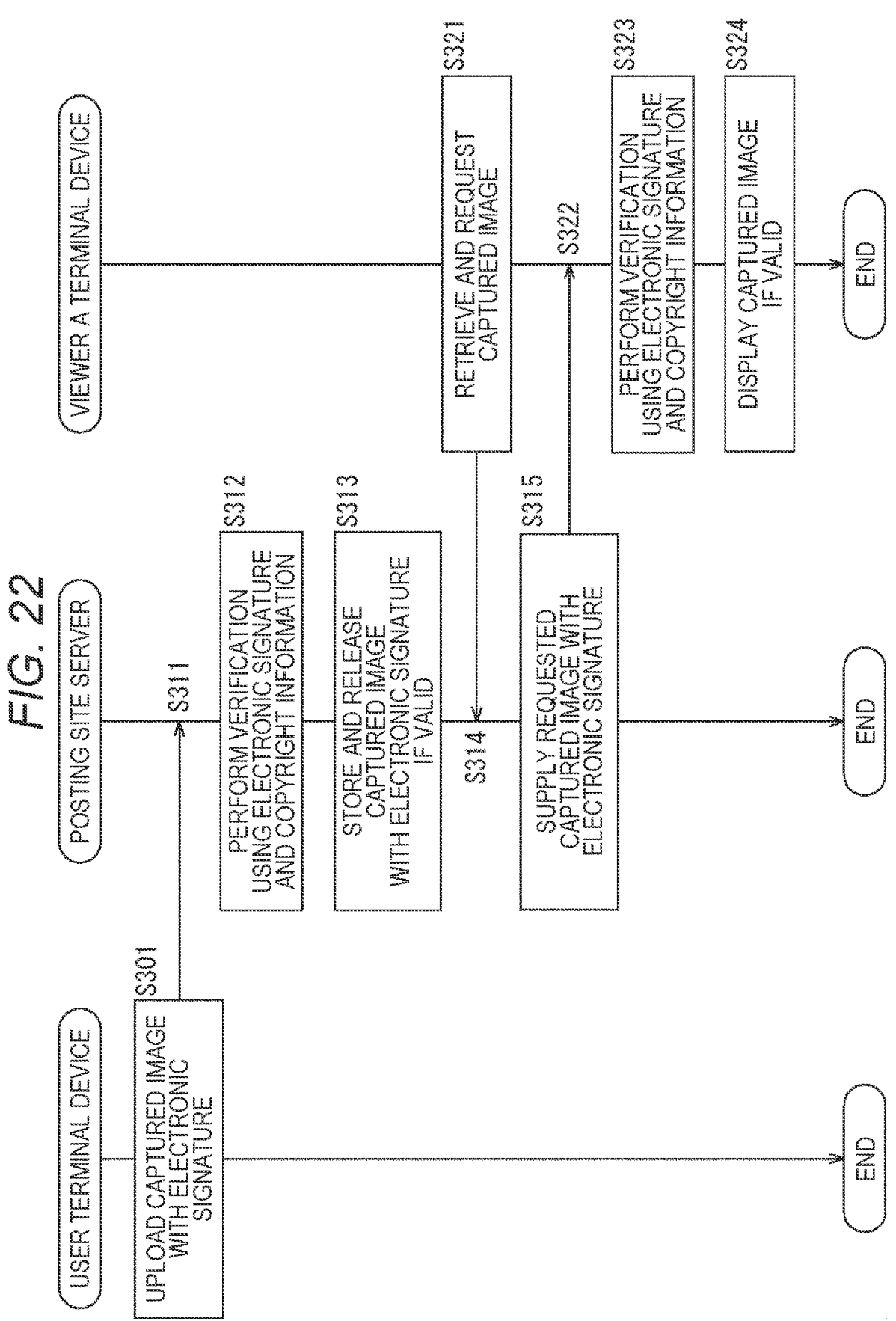
FIG. 22 is a flowchart illustrating an example of a flow of content use processing.

The user terminal device 101 uploads (posts) a captured image with an electronic signature obtained as described above to the posting site server 105. The posting site server 105 releases the captured image with the electronic signature. The viewer A terminal device 106 acquires and displays the released captured image with the electronic signature. In order to use such a captured image (content) with the electronic signature, the user terminal device 101, the posting site server 105, and the viewer A terminal device 106 execute content use processing. An example of a flow of the content use processing will be described with reference to a flowchart of FIG. 22.

When the content use processing is started, in step S301, the posting processing unit 234 of the user terminal device 101 reads a desired captured image with an electronic signature from the captured image storage unit 204 and controls the communication unit 214 to supply (upload) the read captured image with the electronic signature to the posting site server 105. In step S311, the posting reception unit 431 of the posting site server 105 acquires the captured image with the electronic signature via the communication unit 414 in step S311.

In step S312, the captured image verification unit 432 verifies the captured image by using the electronic signature and copyright information. In a case where it is determined in step S313 that the captured image is valid by the verification, the captured image release unit 433 stores the captured image with the electronic signature in the captured image storage unit 402, and moreover, releases the captured image with the electronic signature.

In step S321, the captured image acquisition unit 481 of the viewer A terminal device 106 accesses the posting site server 105 and retrieves a captured image to be browsed. In a case where the desired captured image is inspected, the captured image acquisition unit 481 controls the communication unit 464 to request the captured image from the posting site server 105.

When acquiring such a request in step S314, the captured image release unit 433 reads the requested captured image with the electronic signature from the captured image storage unit 402 and supplies the captured image with the electronic signature to the viewer A terminal device 106, which is a request source, via the communication unit 414 in step S315. In step S322, the captured image acquisition unit 481 acquires the captured image with the electronic signature via the communication unit 464.

In step S323, the captured image verification unit 482 verifies the acquired captured image with the electronic signature by using the electronic signature and the copyright information. In a case where the captured image is determined to be valid by the verification, the display processing unit 483 controls the display (display unit) of the output unit 462 to display the captured image in step S324.

When the process of step S324 ends, the content use processing is ended.

Each device serving as a supply destination of the captured image with the electronic signature can verify the captured image on the basis of information such as the copyright information and the electronic signature by performing the respective processes as described above. Therefore, the use of the content can be managed.

<Flow of Content Secondary Use Processing>

A case where such a captured image with an electronic signature is secondarily used will be described. The posting site server 105, the viewer A terminal device 106, and the viewer B terminal device 107 perform content secondary use processing to secondarily use the captured image with the electronic signature. An example of a flow of the content secondary use processing will be described with reference to a flowchart of FIG. 23.

In step S361, the link release unit 484 of the viewer A terminal device 106 releases a public address of the captured image with the electronic signature in the posting site server 105 as a link.

In step S371, the captured image acquisition unit 491 of the viewer B terminal device 107 accesses the public address of the captured image with the electronic signature of the posting site server 105 via the link.

When receiving such access in step S351, the captured image release unit 433 reads the requested captured image with the electronic signature from the captured image storage unit 402 and supplies the captured image with the electronic signature to the viewer B terminal device 107 via the communication unit 414 in step S352. In step S372, the captured image acquisition unit 491 of the viewer B terminal device 107 acquires the captured image with the electronic signature via the communication unit 464.

In step S373, the captured image verification unit 492 verifies the captured image by using the electronic signature and copyright information of the acquired captured image with the electronic signature. In a case where the captured image is determined to be valid by the verification, the display processing unit 493 controls the display (display unit) of the output unit 462 to display the captured image in step S374.

When the process of step S374 ends, the content secondary use processing is ended.

Each device serving as a supply destination of the captured image with the electronic signature can verify the captured image on the basis of information such as the copyright information and the electronic signature even in the secondary use by performing the respective processes as described above. Therefore, the secondary use of a content can be managed.

2. APPENDIX

<Content>

Although a captured image has been described above as an example of a content, the content for which acquisition and use are managed is not limited to the captured image and may be any content. For example, audio or the like may be used. Furthermore, the captured image may be a still image or a moving image.

<Regarding Association>

Note that the term "associate" or the like in the present specification means to collect a plurality of objects into one, for example, to collect image data and metadata into one piece of data, and is synonymous with terms, for example, "assign", "link", "add", and the like.

Note that "collect" means to enable use (linkage) of one data when another data is processed. That is, the both may be collected physically as one piece of data or may be collected as individually pieces of data. For example, information associated with image data may be transmitted on a transmission path different from a transmission path of the image data. Furthermore, for example, information associated with an image ater may be recorded in a different recording medium (or a different recording area of the same recording medium) from that of the image data.

<Hardware>

The above-described series of processes can be executed by software (an application program) and can also be executed by hardware.

<Object to which Present Technology is Applied>

The present technology can be applied to any configuration. For example, the present technology can also be implemented as a partial configuration of a device such as a processor as system large scale integration (LSI), a module using a plurality of the processors, a unit using a plurality of the modules, and a set in which other functions are added to the unit.

Furthermore, for example, the present technology can also be applied to a network system configured using a plurality of devices. For example, the present technology may be implemented as cloud computing that is shared and processed in cooperation by a plurality of devices via a network. For example, the present technology may be implemented in a cloud service that provides service with respect to any terminal such as a computer, a portable information processing terminal, and an Internet of Things (IoT) device.

Note that the system in the present specification means a set of a plurality of constituent elements (devices, modules (components), and the like), and whether or not all the constituent elements are provided in the same housing does not matter. Therefore, both a plurality of devices housed in separate housings and connected via a network, and a device in which a plurality of modules is housed in one housing are systems.

<Field and Application to Which Present Technology is Applicable>

A system, a device, a processing unit, and the like to which the present technology is applied can be used in any field, for example, transportation, medical care, crime prevention, agriculture, livestock industry, mining, beauty care, factories, home appliances, weather, and natural monitoring. Furthermore, applications thereof are also arbitrary.

<Others>

Embodiments of the present technology are not limited to the above-described embodiments, and various modifications can be made within a scope not departing from a gist of the present technology.

For example, a configuration described as one device (or processing unit) may be divided and configured as a plurality of devices (or processing units). Conversely, configurations described above as a plurality of devices (or processing units) may be collectively configured as one device (or processing unit). Furthermore, of course, a configuration other than the above may be added to the configuration of each device (or each processing unit). Moreover, in a case where the configuration and operation as the entire system are substantially the same, a part of a configuration of one device (or processing unit) may be included in a configuration of another device (or another processing unit).

Furthermore, for example, the above-described program may be executed in any device. In such a case, it is only required to configure the device to have necessary functions (functional blocks and the like) such that necessary information can be obtained.

Furthermore, for example, each step of one flowchart may be executed by one device, or may be shared and executed by a plurality of devices. Moreover, in a case where one step includes a plurality of processes, the plurality of processes may be executed by one device or may be shared and executed by a plurality of devices. In other words, the plurality of processes included in one step can also be executed as processes of a plurality of steps. Conversely, processes described as a plurality of steps can also be collectively executed as one step.

Furthermore, for example, in a program executed by a computer, processes of steps describing the program may be executed in time series in the order be described in the present specification, or may executed in parallel or individually at a necessary timing such as when a call is made.

That is, the processes of the respective steps may be executed in an order different from the above-described order as long as there is no contradiction. Moreover, the processes of the steps describing this program may be executed in parallel with processes of another program, or may be executed in combination with processes of another program.

Furthermore, for example, a plurality of technologies related to the present technology can be independently and individually implemented as long as there is no contradiction. Of course, a plurality of any of the present technologies can also be used in combination. For example, some or all of the present technologies described in any of the embodiments may be combined with some or all of the present technologies described in the other embodiments. Furthermore, some or all of any of the above-described present technologies can also be implemented in combination with other technologies not described above.

Note that the present technology can also have the following configurations.

(1) An information processing device including
a supply unit that supplies, to an external device, a content acquired in a content acquisition permission area and ticket identification information associated with the content and configured to identify a ticket for entering the content acquisition permission area.

(2) The information processing device according to (1), further including
a content copyright information acquisition unit that acquires the content and copyright information associated with the content which are supplied from the external device.

(3) The information processing device according to (2), in which
the copyright information includes at least any one of content use information that is information regarding use of the content, content generation information that is information regarding generation of the content, content right holder information that is information regarding a right holder of the content, or license information that is information regarding a license.

(4) The information processing device according to (3), in which
the content use information includes at least any one of content provision information that is information regarding provision of the content or content duplication/processing information that is information regarding duplication or processing of the content.

(5) The information processing device according to (4), in which
the content provision information includes at least any one of a content provision period condition that is a condition related to a period for providing the content, a content provision destination condition that is a condition related to a provision destination of the content, or a content provision purpose condition that is a condition related to a purpose of providing the content.

(6) The information processing device according to (4) or (5), in which
the content duplication/processing information includes at least any one of a content duplication method condition that is a condition related to a method for duplicating the content or a content processing method condition that is a condition related to a method for processing the content.

(7) The information processing device according to (6), in which
the content duplication method condition includes at least any one of a content unprocessed duplication condition that is a condition related to unprocessed duplication of the content or a content link generation condition that is a condition related to generation of a link of the content.

(8) The information processing device according to (6) or (7), in which
the content processing method condition includes at least any one of a size/aspect ratio change condition that is a condition related to a change of a size or an aspect ratio of an image included in the content, an edited image superimposition condition that is a condition related to superimposition of an edited image on an image included in the content, a color change condition that is a condition related to a change of a color of an image included in the content, an other image combination condition that is a condition related to combination of an image included in the content and another image, an audio processing condition that is a condition related to processing of audio included in the content, or a format change condition that is a condition related to a change of a format of the content.

(9) The information processing device according to any one of (1) to (8), further including
a content acquisition unit that acquires the content.

(10) The information processing device according to (9), further including
an association unit that associates the ticket identification information with the content acquired in the content acquisition permission area by the content acquisition unit.

(11) The information processing device according to (10), in which
the ticket is an electronic ticket including the ticket identification information and acquisition permission information that permits acquisition of the content in the content acquisition permission area, and
the content acquisition unit acquires the content on the basis of the acquisition permission information.

(12) The information processing device according to (11), in which
the acquisition permission information includes at least any one of an acquirable time zone condition that is a condition related to a time zone in which the content is acquirable, an acquisition time length condition that is a condition related to an acquisition time length of the content, an acquisition count condition that is a condition related to a number of times of acquisition of the content, a resolution condition that is a condition related to resolution of the content, a detail condition that is a condition related to a detail of the content, or a format condition that is a condition related to a format of the content.

(13) The information processing device according to any one of (1) to (12), in which
the content is a moving image or a still image.

(14) An information processing device including
a determination unit that determines whether or not to permit use of a content on the basis of user-related information that is information regarding a user corresponding to ticket identification information associated with the content acquired in a content acquisition permission area and configured to identify a ticket for entering the content acquisition permission area.

(15) The information processing device according to (14), further including an association unit that associates at least any one of content use information that is information regarding the use of the content, content generation information that is information regarding generation of the content, content right holder information that is information regarding a right holder of the content, or license information that is information regarding a license with the content in a case where the determination unit determines to permit the use of the content.

(16) The information processing device according to (15), further including an electronic signature association unit that associates an electronic signature corresponding to the content and information associated with the content in a case where the determination unit determines to permit use of the content.

(17) An information processing system including a first information processing device and a second information processing device, in which the first information processing device includes a content ticket identification information supply unit that supplies, to the second information processing device, a content acquired in a content acquisition permission area and ticket identification information associated with the content and configured to identify a ticket for entering the content acquisition permission area, and the second information processing device includes:

a content ticket identification information acquisition unit that acquires the content and the ticket identification information which are supplied from the first information processing device; and a permission determination unit that determines whether or not to permit use of the content on the basis of information regarding a user corresponding to the ticket identification information acquired by the content ticket identification information acquisition unit.

(18) The information processing system according to (17), in which the second information processing device further includes:

a copyright information association unit that associates copyright information with the content when the permission determination unit determines to permit the use of the content;

an electronic signature association unit that generates an electronic signature corresponding to the content and the copyright information and associates the electronic signature with the content and the copyright information; and an electronic signature-assigned content supply unit that supplies, to the first information processing device, an electronic signature-assigned content including the content and the copyright information which have been associated with the electronic signature by the electronic signature association unit, and the first information processing device further includes:

an electronic signature-assigned content acquisition unit that acquires the electronic signature-assigned content supplied from the second information processing device; and a posting unit that posts the electronic signature-assigned content acquired by the electronic signature-assigned content acquisition unit to a posting site.

(19) The information processing system according to (17) or (18), further including a third information processing device, in which the third information processing device includes:

a purchaser information acquisition unit that acquires purchaser information that is information regarding a purchaser of the ticket supplied from the first information processing device;

a confirmation unit that supplies the purchaser information to the second information processing device to cause the second information processing device to confirm whether the purchaser has been permitted to acquire the content; and a ticket issuing unit that issues the ticket in a case where it is determined by processing of the confirmation unit that the purchaser has been permitted to acquire the content.

(20) The information processing system according to any one of (17) to (19), further including a monitoring device, in which the monitoring device includes:

a purchaser information acquisition unit that acquires purchaser information which is information regarding a purchaser of the ticket to enter the content acquisition permission area;

an imaging unit that captures an image of the content acquisition permission area;

an acquirer detection unit that detects an acquirer who acquires the content on the basis of the captured image of the content acquisition permission area obtained by the imaging unit; and a purchaser determination unit that determines whether the acquirer detected by the acquirer detection unit is the purchaser of the ticket on the basis of the purchaser information acquired by the purchaser information acquisition unit.

REFERENCE SIGNS LIST

100 Content management system
101 User terminal device
102 Ticket sales server
103 Copyright management server
104 Imaging monitoring device
105 Posting site server
106 Viewer A terminal device
107 Viewer B terminal device
201 Information processing unit
202 Imaging unit
203 Ticket information storage unit
204 Captured image storage unit
231 Ticket purchase processing unit
232 Imaging control unit
233 Electronic signature processing unit
234 Posting processing unit
251 Information processing unit
252 Sales information storage unit
281 Ticket sales processing unit
282 Purchaser information confirmation unit
301 Information processing unit
302 Purchaser information storage unit
303 Sales information storage unit
304 Copyright information storage unit
331 Sales possibility determination processing unit
332 Imaging permission seat map supply unit
333 Electronic signature processing unit
334 Ticket information verification unit 335 Copyright information association unit
351 Information processing unit
352 Imaging unit
353 Imaging permission seat map storage unit
381 Imaging permission seat map acquisition unit
382 Monitoring processing unit
401 Information processing unit
402 Captured image storage unit
431 Posting reception unit
432 Captured image verification unit
433 Captured image release unit
451 Information processing unit
481 Captured image acquisition unit
482 Captured image verification unit
483 Display processing unit
484 Link release unit
491 Captured image acquisition unit
492 Captured image verification unit
493 Display processing unit
601 Electronic ticket

The invention claimed is:

1. An information processing device comprising:
a memory storing a program, and
at least one processor configured to execute the program
    to perform operations comprising:
supplying, to an external device, an unvetted version of a
    content acquired in a content acquisition permission
    area and ticket identification information associated
    with the content;
identifying a ticket for entering the content acquisition
    permission area;
applying for an electronic signature corresponding to the
    content; and
receiving, from the external device, a vetted version of the
    content and the electronic signature, the electronic
    signature validating that the ticket information is veri-
    fied and that copyright information is associated with
    the content by the external device.

2. The information processing device according to claim
1, wherein the copyright information includes at least any
one of content use information that is information regarding
use of the content, content generation information that is
information regarding generation of the content, content
right holder information that is information regarding a right
holder of the content, or license information that is infor-
mation regarding a license.

3. The information processing device according to claim
2, wherein the content use information includes at least any
one of content provision information that is information
regarding provision of the content or content duplication/
processing information that is information regarding dupli-
cation or processing of the content.

4. The information processing device according to claim
3, wherein the content provision information includes at
least any one of a content provision period condition that is
a condition related to a period for providing the content, a
content provision destination condition that is a condition
related to a provision destination of the content, or a content
provision purpose condition that is a condition related to a
purpose of providing the content.

5. The information processing device according to claim
3, wherein the content duplication/processing information
includes at least any one of a content duplication method
condition that is a condition related to a method for dupli-
cating the content or a content processing method condition
that is a condition related to a method for processing the
content.

6. The information processing device according to claim
5, wherein the content duplication method condition
includes at least any one of a content unprocessed duplica-
tion condition that is a condition related to unprocessed
duplication of the content or a content link generation
condition that is a condition related to generation of a link
of the content.

7. The information processing device according to claim
5, wherein the content processing method condition includes
at least any one of a size/aspect ratio change condition that
is a condition related to a change of a size or an aspect ratio
of an image included in the content, an edited image
superimposition condition that is a condition related to
superimposition of an edited image on an image included in
the content, a color change condition that is a condition
related to a change of a color of an image included in the
content, an other image combination condition that is a
condition related to combination of an image included in the
content and another image, an audio processing condition
that is a condition related to processing of audio included in
the content, or a format change condition that is a condition
related to a change of a format of the content.

8. The information processing device according to claim
1, wherein the operations further comprise:
acquiring the content.

9. The information processing device according to claim
8, wherein the operations further comprise:
associating the ticket identification information with the
    content acquired in the content acquisition permission
    area.

10. The information processing device according to claim
9, wherein
the ticket is an electronic ticket including the ticket
    identification information and acquisition permission
    information that permits acquisition of the content in
    the content acquisition permission area, and
acquiring content is performed on a basis of the acquisi-
    tion permission information.

11. The information processing device according to claim
10, wherein
the acquisition permission information includes at least
    any one of an acquirable time zone condition that is a
    condition related to a time zone in which the content is
    acquirable, an acquisition time length condition that is
    a condition related to an acquisition time length of the
    content, an acquisition count condition that is a condi-
    tion related to a number of times of acquisition of the
    content, a resolution condition that is a condition
    related to resolution of the content, a detail condition
    that is a condition related to a detail of the content, or
    a format condition that is a condition related to a format
    of the content.

12. The information processing device according to claim
1, wherein the content is a moving image or a still image.

13. A non-transitory computer readable medium storing a
program for information processing, the program being
executable by at least one processor to perform operations
comprising:
supplying, to an external device, an unvetted version of a
    content acquired in a content acquisition permission
    area and ticket identification information associated
    with the content;
identifying a ticket for entering the content acquisition
    permission area;
applying for an electronic signature corresponding to the
    content; and receiving, from the external device, a vetted version of the content and the electronic signature, the electronic signature validating that the ticket information is verified and that copyright information is associated with the content by the external device.

14. The non-transitory computer readable medium according to claim 13, wherein the copyright information includes at least any one of content use information that is information regarding use of the content, content generation information that is information regarding generation of the content, content right holder information that is information regarding a right holder of the content, or license information that is information regarding a license.

15. The non-transitory computer readable medium according to claim 14, wherein the content use information includes at least any one of content provision information that is information regarding provision of the content or content duplication/processing information that is information regarding duplication or processing of the content.

16. The non-transitory computer readable medium according to claim 15, wherein the content provision information includes at least any one of a content provision period condition that is a condition related to a period for providing the content, a content provision destination condition that is a condition related to a provision destination of the content, or a content provision purpose condition that is a condition related to a purpose of providing the content.

17. The non-transitory computer readable medium according to claim 15, wherein the content duplication/processing information includes at least any one of a content duplication method condition that is a condition related to a method for duplicating the content or a content processing method condition that is a condition related to a method for processing the content.

18. The non-transitory computer readable medium according to claim 17, wherein the content duplication method condition includes at least any one of a content unprocessed duplication condition that is a condition related to unprocessed duplication of the content or a content link generation condition that is a condition related to generation of a link of the content.

19. The non-transitory computer readable medium according to claim 17, wherein the content processing method condition includes at least any one of a size/aspect ratio change condition that is a condition related to a change of a size or an aspect ratio of an image included in the content, an edited image superimposition condition that is a condition related to superimposition of an edited image on an image included in the content, a color change condition that is a condition related to a change of a color of an image included in the content, an other image combination condition that is a condition related to combination of an image included in the content and another image, an audio processing condition that is a condition related to processing of audio included in the content, or a format change condition that is a condition related to a change of a format of the content.

20. The non-transitory computer readable medium according to claim 13, wherein the content is a moving image or a still image.

* * * * *